US011469859B2

(12) United States Patent
Shellhammer et al.

(10) Patent No.: US 11,469,859 B2
(45) Date of Patent: Oct. 11, 2022

(54) HYBRID AUTOMATIC REPEAT REQUEST (HARQ) TECHNIQUE BASED ON RECEIVER PROCESSING CAPABILITY

(71) Applicant: QUALCOMM Incorporated, San Diego, CA (US)

(72) Inventors: Stephen Jay Shellhammer, Ramona, CA (US); Jialing Li Chen, San Diego, CA (US); Dung Ngoc Doan, San Diego, CA (US); Bin Tian, San Diego, CA (US); Youhan Kim, Saratoga, CA (US); Alfred Asterjadhi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 16/852,364

(22) Filed: Apr. 17, 2020

(65) Prior Publication Data

US 2020/0344006 A1 Oct. 29, 2020

Related U.S. Application Data

(60) Provisional application No. 62/838,878, filed on Apr. 25, 2019.

(51) Int. Cl.
*H04L 1/18* (2006.01)
*H04W 8/24* (2009.01)
*H04W 80/02* (2009.01)
*H04L 5/00* (2006.01)
*H04W 84/12* (2009.01)

(52) U.S. Cl.
CPC .......... *H04L 1/1819* (2013.01); *H04L 5/0055* (2013.01); *H04W 8/245* (2013.01); *H04W 80/02* (2013.01); *H04W 84/12* (2013.01)

(58) Field of Classification Search
CPC .... H04L 1/1819; H04L 5/0055; H04W 8/245; H04W 80/02
See application file for complete search history.

(56) References Cited

U.S. PATENT DOCUMENTS

| 2012/0218882 | A1* | 8/2012 | Ko ........................ | H04B 7/0456 370/335 |
| 2017/0230149 | A1* | 8/2017 | Wang .................... | H04L 1/1664 |
| 2018/0220323 | A1* | 8/2018 | Chen .................... | H04L 1/1854 |
| 2020/0044782 | A1* | 2/2020 | Vaidya ................. | H04L 1/1861 |
| 2020/0052832 | A1* | 2/2020 | Tian ...................... | H04L 1/1614 |

* cited by examiner

*Primary Examiner* — Walli Z Butt
*Assistant Examiner* — Ryan C Kavleski
(74) *Attorney, Agent, or Firm* — DeLizio Law, PLLC

(57) ABSTRACT

This disclosure provides systems, methods, and apparatus, including computer programs encoded on computer-readable media, for implementing a retransmission protocol in a wireless local area network (WLAN). The retransmission protocol may be based on a hybrid automatic repeat request (HARQ) protocol that supports a delayed acknowledgement for a HARQ retransmission based on receiver processing capability. A first WLAN device may determine that a second WLAN device requires more time to process the HARQ retransmission and may transmit a different communication (interlaced within the HARQ process) to either the second WLAN device or a third WLAN device during the time that the second WLAN device is processing the HARQ retransmission.

33 Claims, 19 Drawing Sheets

HYBRID AUTOMATIC REPEAT REQUEST (HARQ) TECHNIQUE BASED ON RECEIVER PROCESSING CAPABILITY

CROSS-REFERENCE TO RELATED APPLICATIONS

This Patent Application claims priority to U.S. Provisional Patent Application No. 62/838,878 filed Apr. 25, 2019, entitled "HYBRID AUTOMATIC REPEAT REQUEST (HARQ) TECHNIQUE BASED ON RECEIVER PROCESSING CAPABILITY," and assigned to the assignee hereof. The disclosure of the prior Application is considered part of and is incorporated by reference in this Patent Application.

TECHNICAL FIELD

This disclosure relates to the field of wireless communication, and more particularly to implementing a retransmission protocol in a wireless local area network (WLAN).

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. An AP is a type of WLAN device that performs a distribution system access function in the WLAN. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Wireless communication between two WLAN devices may be unreliable, susceptible to interference or other challenges which impair the wireless communication medium. A retransmission protocol may be used to provide reliable delivery of communications from a first WLAN device (such as an AP) to a second WLAN device (such as a STA). For example, a wireless transmission from the AP may include error checking and redundancy information that may enable the STA to discover or correct errors in the wireless transmission. If the errors cannot be corrected, the STA may request a retransmission from the AP. A traditional retransmission protocol may include a feedback message to request a retransmission of data from the AP. Current retransmission protocols may be improved.

SUMMARY

The systems, methods, and devices of this disclosure each have several innovative aspects, no single one of which is solely responsible for the desirable attributes disclosed herein.

One innovative aspect of the subject matter described in this disclosure can be implemented as a method performed by a first wireless local area network (WLAN) device, such as an access point (AP), for implementing a hybrid automatic repeat request (HARQ) protocol. The method may include transmitting a first HARQ initial transmission from the first WLAN device to a second WLAN device. The first HARQ initial transmission includes a first plurality of codewords. The method may include determining one or more codewords of the first plurality of codewords that the second WLAN device is unable to decode based on a first feedback message from the second WLAN device. For example, the one or more codewords may include at least a first codeword. The method may include generating a first HARQ retransmission that includes retransmitted information corresponding to at least the first codeword. The method may include transmitting the first HARQ retransmission to the second WLAN device. The method may include transmitting a different communication to either the second WLAN device or a third WLAN device after communicating the first HARQ retransmission and before receiving a second feedback message regarding the first HARQ retransmission.

In some implementations, determining that the second WLAN device is unable to decode at least the first codeword includes receiving the first feedback message from the second WLAN device in response to the first HARQ initial transmission. The first feedback message may indicate which codewords or groups of codewords of the first HARQ initial transmission were decoded by the second WLAN device.

In some implementations, the first feedback message includes a bitmap to indicate which codewords or groups of codewords of the first HARQ initial transmission were successfully decoded by the second WLAN device.

In some implementations, the first HARQ retransmission includes a punctured version of the first codeword that was included in the first HARQ initial transmission.

In some implementations, the first HARQ initial transmission includes data and a first set of parity bits associated with the data. In some implementations, the first HARQ retransmission includes a second set of parity bits associated with the data.

In some implementations, the first HARQ initial transmission includes data bits of the first codeword and a first subset of parity bits associated with the data bits, the first subset of parity bits not including punctured bits. In some implementations, the first HARQ retransmission includes at least a second subset of the parity bits associated with data bits, the second subset of parity bits including the punctured bits.

In some implementations, the first HARQ retransmission further includes repeated data bits of the first codeword.

In some implementations, transmitting the different communication includes transmitting a different HARQ initial transmission to the third WLAN device, transmitting a different HARQ retransmission to the third WLAN device, or transmitting a non-HARQ transmission to the third WLAN device.

In some implementations, transmitting the different communication includes transmitting a second HARQ initial transmission to the second WLAN device. For example, the second HARQ initial transmission may include a different plurality of codewords than were included in the first HARQ initial transmission.

In some implementations, the method may include receiving a capability message from the second WLAN device indicating HARQ capabilities of the second WLAN device. In some implementations, the method may include determining that the first WLAN device and the second WLAN device both support a delayed acknowledgement feature of the HARQ protocol based on the capability message.

In some implementations, the capability message includes a delayed acknowledgement feature capability indicator from the second WLAN device that indicates that the second WLAN device supports the delayed acknowledgement feature.

In some implementations, the capability message indicates that the second WLAN device supports a version of the HARQ protocol that includes the delayed acknowledgement feature.

In some implementations, the different communication is transmitted to the third WLAN device. In some implementations, the first HARQ retransmission further includes signaling to instruct the second WLAN device to delay the second feedback message until after the different communication.

In some implementations, the signaling is usable by the second WLAN device to determine a time to send the second feedback message.

In some implementations, the signaling includes a time offset or time indicator.

In some implementations, the signaling instructs the second WLAN device to refrain from sending the second feedback message until the first WLAN device sends a feedback request message.

In some implementations, the feedback request message includes a block acknowledgement request (BAR) message.

In some implementations, the method may include determining a receiver processing capability of the second WLAN device. The receiver processing capability may be associated with at least one constraint. Examples of constraints include a time delay for the second WLAN device to process the first HARQ retransmission, a codeword processing rate of the second WLAN device, a quantity of codewords within an orthogonal frequency division multiplexing (OFDM) symbol that the second WLAN device can process in a time period associated with the OFDM symbol.

In some implementations, the method may include determining to transmit the different communication based on the receiver processing capability.

In some implementations, the receiver processing capability is based on an amount of time for physical (PHY) layer processing of the first codeword using the first HARQ retransmission to determine a corrected first codeword.

In some implementations, the receiver processing capability is further based on a media access control (MAC) layer processing time of the first HARQ initial transmission with the corrected first codeword.

In some implementations, the receiver processing capability is further based on the MAC layer processing time to prepare an acknowledgement to an aggregated MAC protocol data unit (A-MPDU) associated with the first HARQ initial transmission.

In some implementations, the method may include, after outputting for transmission the different communication, generating a block acknowledgement request (BAR) message addressed to the second WLAN device. The method may include transmitting the BAR message to the second WLAN device and receiving a block acknowledgement (BA) message from the second WLAN device. The BA message may indicate which packets of the first HARQ initial transmission where properly received after processing the first HARQ retransmission.

In some implementations, the method may include generating an aggregated media access control (MAC) protocol data unit (A-MPDU). The method may include generating codewords based on the A-MPDU. The codewords may include at least the first plurality of codewords and a second plurality of codewords. The method may include including the first plurality of codewords in the first HARQ transmission. The method may include including the one or more codewords of the first plurality of codewords in the first HARQ retransmission.

In some implementations, transmitting the first HARQ retransmission to the second WLAN device includes transmitting the second plurality of codewords of the A-MPDU together with the one or more codewords of the first plurality of codewords that the second WLAN device is unable to decode in the first HARQ retransmission.

In some implementations, the first plurality of codewords are related to a source data to transmit to the second WLAN device. In some implementations, generating the first HARQ retransmission includes generating the first HARQ retransmission having retransmitted information corresponding to the one or more codewords of the first plurality of codewords that the second WLAN device is unable to decode in a message that also includes a second HARQ initial transmission having a second plurality of codewords related to the source data.

In some implementations, the method may include transmitting a series of HARQ initial transmissions based on the source data. A subsequent HARQ retransmission may be optionally included before each subsequent HARQ initial transmission. The subsequent HARQ retransmission may be based on at least a portion of codewords that were not properly decoded in the previous HARQ initial transmission. The method may include receiving a HARQ feedback from the second WLAN device after each HARQ initial transmission. The HARQ feedback may include feedback regarding a portion of an earlier HARQ initial transmission preceding the most recent HARQ initial transmission.

In some implementations, the method may include determining a HARQ feedback window based on a receiver processing capability of the second WLAN device. The HARQ feedback window may be a different size than a quantity of codewords included in each HARQ initial transmission.

In some implementations, the first WLAN device is an access point (AP) and the second WLAN device is a station (STA).

In some implementations, the method may include, after transmitting the first HARQ retransmission and before transmitting the different communication, receiving a physical layer (PHY) acknowledgement from the second WLAN device. The PHY acknowledgement may indicate that the second WLAN device received the first HARQ retransmission before the second WLAN device decodes the first codeword.

Another innovative aspect of the subject matter described in this disclosure can be implemented as a method performed by a first wireless local area network (WLAN) device for implementing a hybrid automatic repeat request (HARQ) protocol. The method may include receiving a first HARQ initial transmission from a second WLAN device, the first HARQ initial transmission including a first plurality of codewords. The method may include transmitting a first feedback message in response to the first HARQ initial transmission, the first feedback message indicating one or more codewords of the first plurality of FEC codewords that the first WLAN device is unable to decode. The method may include receiving a first HARQ retransmission that includes retransmitted information corresponding to the one or more codewords indicated in the first feedback message. The method may include refraining from transmitting a second feedback message regarding the HARQ retransmission while the second WLAN device transmits a different communication to either the first WLAN device or a third WLAN device.

In some implementations, the method may include transmitting a capability message that includes an indicator that the first WLAN device supports a delayed acknowledgement feature. The method may include receiving an instruction from the second WLAN device to use the delayed acknowledgement feature which causes the first WLAN device to refrain from transmitting the second feedback message regarding the first HARQ retransmission while the second WLAN device communicates the different communication.

In some implementations, the method may include transmitting the second feedback message to the second WLAN device after the different communication.

In some implementations, the second feedback message is transmitted in response to a feedback request message from the second WLAN device.

In some implementations, the second feedback message is transmitted at a scheduled time indicated in a header of the first HARQ retransmission.

In some implementations, the different communication includes a second HARQ initial transmission. The method may include receiving a HARQ physical protocol data unit (PPDU) that includes the first HARQ retransmission based on the first plurality of codewords and the second HARQ initial transmission for a second plurality of codewords.

In some implementations, the method may include transmitting the second feedback message after the different communication. The second feedback message may include feedback regarding the first HARQ retransmission and regarding the second HARQ initial transmission.

In some implementations, the method may include transmitting a physical layer (PHY) preamble acknowledgement after the first HARQ retransmission. The PHY preamble acknowledgement may indicate that the second WLAN device received a preamble of the first HARQ retransmission without indicating that the second WLAN device has processed a payload of the first HARQ retransmission.

Aspects of the subject matter described in this disclosure can be implemented a method, a device, a software program, a system, or other means to perform the above-mentioned features.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
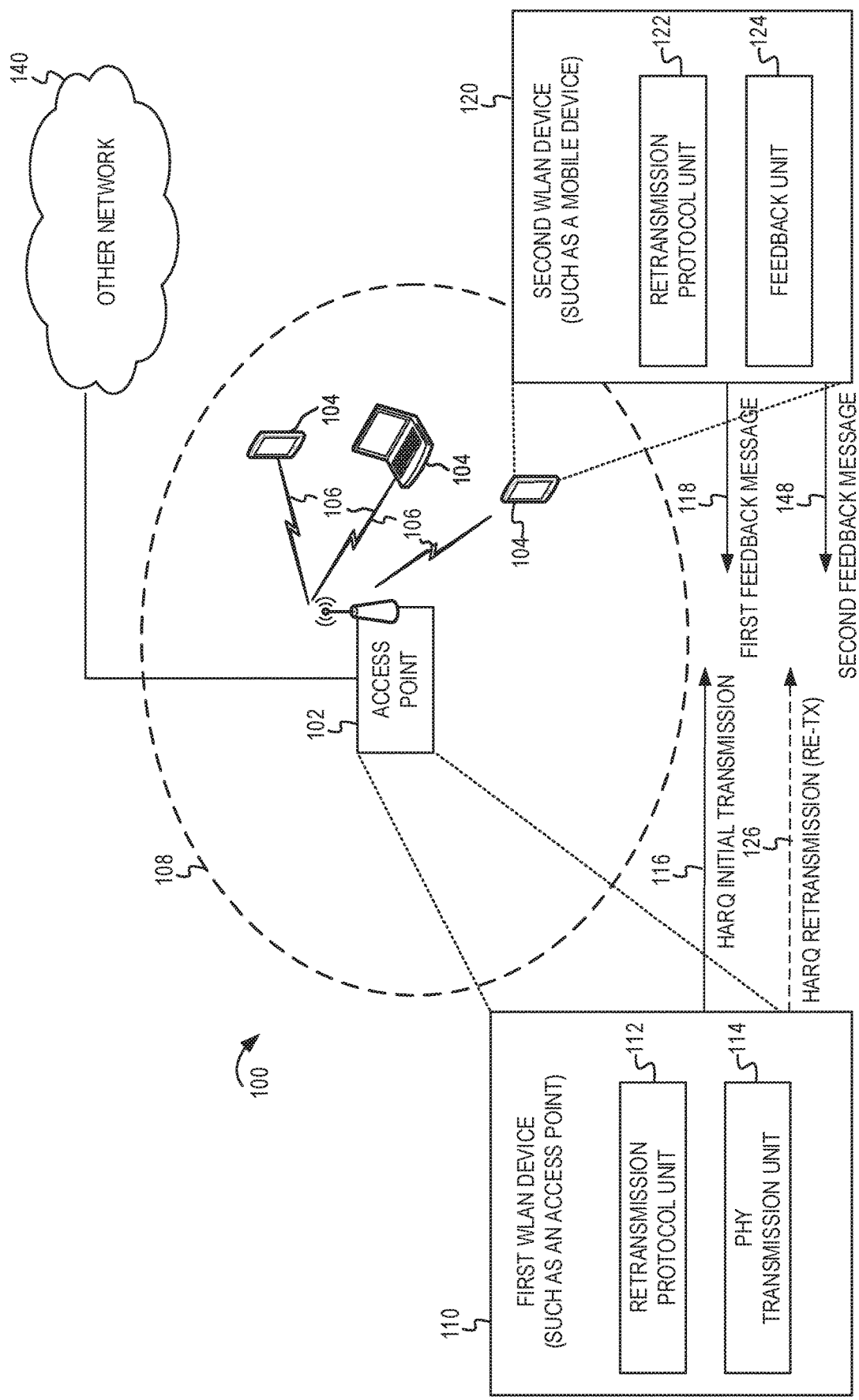
FIG. 1 depicts a system diagram of an example wireless local area network (WLAN) for introducing concepts of this disclosure.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

A wireless local area network (WLAN) in a home, apartment, business, or other area may include one or more WLAN devices. Each WLAN device may have a station (STA) interface which is an addressable entity that shares a wireless communication medium with other STAs. An AP is a type of STA that performs a distribution system access function in the WLAN. In some documents, WLAN devices may be referred to as STAs, regardless of whether the WLAN device is an AP or a non-AP STA. For brevity in this disclosure, a first WLAN device (which may be referred to as an AP or sending STA in this document) may communicate data to a second WLAN device (which may be referred to as a STA or receiving STA in this document). Due to the nature of wireless communication, the WLAN devices may implement a retransmission protocol to improve reliable delivery of a media access control (MAC) protocol data unit (MPDU) or to improve the overall throughput from the first WLAN device to the second WLAN device. A physical convergence layer (PHY) protocol data unit (PPDU) may include one or more MPDUs. For example, one type of PPDU (referred to as an Aggregated MPDU, or A-MPDU) may include multiple MPDUs in a payload of the AMPDU. A PPDU also may be referred to as a packet or a frame in some aspects of this disclosure.

A traditional retransmission protocol (which may be referred to as a baseline approach) may rely on retransmission of a full PPDU or MPDU. For example, a first WLAN device may await an acknowledgement (ACK) message to determine if the second WLAN device has received the MPDU. In some implementations, the absence of an ACK may be interpreted as a negative acknowledgement (NACK). A second WLAN device may send a traditional ACK message to the first WLAN device to indicate whether the second WLAN device has successfully received a MPDU. If the first WLAN device doesn't receive a traditional ACK message (by an expected time) in response to a MPDU, the first WLAN device may retransmit the original MPDU. In another retransmission protocol, the second WLAN device may bundle ACKs or NACKs for multiple MPDUs in a block acknowledgement feedback message. The block acknowledgement feedback message may be referred to as a Block ACK message type. The Block ACK message type may indicate which MPDUs in an A-MPDU have been successfully received. A first WLAN device may retransmit those MPDUs which are not indicated as being received correctly in the Block ACK feedback message.

Hybrid automatic repeat request (hybrid ARQ or HARQ) is another retransmission protocol, sometimes used in wide area wireless communication systems. HARQ uses a combination of error detection and error correction. A HARQ transmission may include error checking bits that are added to data to be transmitted using an error-detecting (ED) code such as a cyclic redundancy check (CRC). The error checking bits may be used by a second WLAN device to determine if it has properly decoded the received HARQ transmission. Additionally, the HARQ transmission may utilize an error correction technique. For example, the original data may be encoded with a forward error correction (FEC) encoding. Both the original data and parity bits may be sent in a HARQ transmission. A second WLAN device may be able to use the parity bits to correct errors in the transmission, thus avoiding a full retransmission. The ED code may be omitted when encoding is used that can perform both FEC and ED, such as a Reed-Solomon code. Also, low-density parity check (LDPC) codes can perform error detection by checking the values of the parity bits, after convergence of the LDPC decoder. Another feature of HARQ is that a second WLAN device may store and combine portions of a HARQ initial transmission with corresponding signals from a HARQ retransmission. For example, if the second WLAN device cannot properly decode (and cannot correct the errors) the HARQ initial transmission, the second WLAN device may send a HARQ feedback message that indicates at least part of the HARQ initial transmission was not properly decoded. In response to receiving the HARQ feedback message, the first WLAN device may transmit a HARQ retransmission to the second WLAN device to retransmit at least part of the HARQ initial transmission that was not acknowledged. The second WLAN device may combine the HARQ retransmission with the HARQ initial transmission to determine a total signal that can be decoded. The combined HARQ transmissions may be processed for decoding and error correction.

Various implementations of this disclosure relate generally to an efficient retransmission protocol based on HARQ which also supports a capability of a first WLAN device to interlace a different communication in the HARQ process. For example, the time associated with the different communication may be used by the second WLAN device to process a HARQ retransmission before sending a subsequent feedback message. Some implementations more specifically relate to the first WLAN device determining whether to expect an immediate feedback from the second WLAN device or to instruct the second WLAN device to use a delayed acknowledgement feature. The first WLAN device may use the delayed acknowledgement feature to instruct the second WLAN device to refrain from sending a HARQ feedback while the first WLAN device transmits a different communication (which also may be referred to as an intervening communication or an interlaced communication). For example, the first WLAN device may interlace a different communication to provide additional time for a second WLAN device to process HARQ retransmission, to make efficient use of the wireless channel, or both. In some implementations, the retransmission protocol may support aggregation of a HARQ retransmission with a HARQ initial transmission for a next group of codewords.

In some implementations, a HARQ protocol may support partial retransmission of data from a first WLAN device to a second WLAN device. For example, in chase combining, the first WLAN device may transmit the same FEC codewords in the HARQ retransmission that were in the HARQ initial transmission. In punctured chase combining, the first WLAN device may puncture some of the coded bits from the original FEC codewords to reduce the airtime needed for the HARQ retransmission. In some implementations, incremental redundancy may use some of the original codeword and additional error correcting codes (such as additional parity bits). For brevity, many of the examples of this disclosure are based on low-density parity check (LDPC) encoding. However, other types of FEC encoding may be used, such as binary convolutional coding (BCC).

In one aspect of this disclosure, a first WLAN device may store information regarding source data and FEC encoding used in an original transmission (such as a HARQ initial transmission). The FEC encoding produces a first set of parity bits that are communicated with the source data. The FEC encoded data may be communicated as FEC codewords in the HARQ initial transmission. The first WLAN device may communicate additional parity bits associated with a particular FEC codeword when sending the HARQ retransmission. In another example, the first WLAN device may retransmit a punctured version of the original FEC codeword when sending the HARQ retransmission.

A second WLAN device may indicate which portions of the HARQ initial transmission were not properly received. The first WLAN device may determine which FEC codewords of the HARQ initial transmission are needed to be retransmitted in the HARQ retransmission. The first WLAN device may utilize a memory (such as a buffer) of the transmitter to store source data and FEC codewords until they have been acknowledged. Similarly, the second WLAN device may utilize memory (such as a buffer) of the receiver to store previous FEC codewords for use with the HARQ retransmission. In some implementations, the first WLAN device and the second WLAN device may negotiate parameters to facilitate the retransmission protocol. For example, the first WLAN device and the second WLAN device may exchange capability information or other parameters associated with the retransmission protocol. In some implementations, the first WLAN device and the second WLAN device may determine the receiver processing capability. The receiver processing capability may indicate a rate at which the second WLAN device can effectively process the HARQ retransmission and produce a feedback message based on the combined HARQ initial transmission and HARQ retransmission. Because the HARQ retransmission may be smaller (include fewer bits from a given LDPC codeword) than the HARQ initial transmission, it is possible that the second WLAN device cannot process the HARQ retransmission before the feedback message is expected. Furthermore, the processing of the HARQ retransmission may be more complex since it includes combining a stored original copy of codeword with the retransmitted bits of the codeword.

By exchanging parameters of the receiver processing capability, the first WLAN device may determine that the second WLAN device needs more time to process the HARQ retransmission. If the first WLAN device has further data to send, the first WLAN device may instruct the second WLAN device that the first WLAN device will interlace another communication before the second WLAN device sends the feedback message. This may provide time for the second WLAN device to process the HARQ retransmission while also making efficient use of the wireless channel. After the interlaced communication, the second WLAN device may send a feedback message based on the HARQ retransmission. The feedback message from the second WLAN device may be a Block Ack message (based on MAC layer processing of the MPDU5) or a HARQ feedback (based on PHY layer decoding of the FEC codewords).

In some implementations, the first WLAN device may interlace a communication to a third WLAN device while the second WLAN device is processing the HARQ retransmission. For example, the first WLAN device may send a HARQ or non-HARQ message to the third WLAN device. In some implementations, the interlaced communication may be aggregated in a same PPDU or may be sent as a separate PPDU following the PPDU that includes the HARQ retransmission to the second WLAN device. Signaling in the header of the PPDU that includes the HARQ retransmission may instruct the second WLAN device to delay acknowledgement for the HARQ retransmission until after an explicit feedback request or based on a scheduled time for the feedback.

In some implementations, the first WLAN device may interlace a further communication to the second WLAN device. For example, the first WLAN device may interlace a new HARQ initial transmission (for a subsequent block of data or a subsequent PSDU) to the second WLAN device. The second WLAN device may store and process the new HARQ initial transmission after the second WLAN device processes the HARQ retransmission for the previous HARQ initial transmission. In some implementations, the first WLAN device may aggregate a HARQ retransmission and new HARQ initial transmission in the same PPDU. A delimiter or header may signal the second WLAN device regarding the parts of the PPDU. In some implementations, a HARQ feedback technique may be based on a series of HARQ initial transmissions (and corresponding HARQ retransmissions) being divided into groups of codewords.

In some implementations, the first WLAN device may determine whether to use a delayed acknowledgement feature of the retransmission protocol based on whether the second WLAN device supports the feature, whether other data is available to send, and the receiver processing capability of the second WLAN device. The first WLAN device may signal when to use the delayed acknowledgement feature using a PHY header indicator. For example, a portion of the PHY header may be defined to indicate whether the second WLAN device is instructed to provide an immediate feedback or a delayed feedback to a HARQ retransmission.

In some implementations, the second WLAN device may provide a PHY acknowledgement before processing the HARQ retransmission. For example, the PHY acknowledgement may be used to indicate that the physical layer of the second WLAN device has received the HARQ retransmission (before any decoding or MAC layer processing). The PHY acknowledgement may be followed by an interlaced communication while the second WLAN device continues to process the FEC codewords of the HARQ retransmission.

In some implementations, timing for a second feedback message following the HARQ retransmission may be scheduled. For example, the first WLAN device may signal a time parameter with the HARQ retransmission to inform the second WLAN device to delay the second feedback message based on the time parameter. In some implementations, the time parameter may be included in a PHY header. The time parameter may be based on a time offset, a scheduled time, an interframe space following the HARQ retransmission, or the like. The second WLAN device may determine when to send the second WLAN device based on the time parameter. The scheduled time for the second WLAN device may be based on a duration associated with the interlaced communication. For example, the first WLAN device may determine the scheduled time to signal to the second WLAN device based on an expected duration of the interlaced communication.

Particular implementations of the subject matter described in this disclosure can be implemented to realize one or more of the following potential advantages. Implementing a retransmission protocol in a WLAN may improve the reliability of data communicated from a first WLAN device to a second WLAN device. A retransmission protocol may improve the overall throughput from the first WLAN device to the second WLAN device. The use of interlaced communication enables the first WLAN device to make efficient use of the wireless channel while providing additional time for the second WLAN device to process the HARQ retransmission. Various implementations may use aggregation of HARQ initial transmission and HARQ retransmission to improve a HARQ retransmission protocol. Furthermore, PHY header signaling may enable the first WLAN device to control aspects (such as timing and type of feedback messages) on a per-transmission basis.

FIG. 1 depicts a system diagram of an example WLAN for introducing concepts of this disclosure. FIG. 1 includes a block diagram of an example wireless communication network 100. According to some aspects, the wireless communication network 100 can be an example of a WLAN such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an AP 102 and multiple STAs 104 having wireless associations with the AP 102. While only one AP 102 is shown, the WLAN 100 also can include multiple APs 102. The IEEE 802.11-2016 standard defines a STA as an addressable unit. An AP is an entity that contains at least one STA and provides access via a wireless medium (WM) for associated STAs to access a distribution service (such as another network 140). Thus, an AP includes a STA and a distribution system access function (DSAF). In the example of FIG. 1, the AP 102 may be connected to a gateway device (not shown) which provides connectivity to the other network 140. The DSAF of the AP 102 may provide access between the STAs 104 and another network 140. While AP 102 is described as an access point using an infrastructure mode, in some implementations, the AP 102 may be a traditional STA which is operating as an AP. For example, the AP 102 may be a STA capable of operating in a peer-to-peer mode or independent mode. In some other examples, the AP 102 may be a software AP (SoftAP) operating on a computer system.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), wearable devices, music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a media access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link" or "wireless association"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 106. Additionally, two STAs 104 may communicate via a direct communication link 106 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 106 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of standards (such as that defined by the IEEE 802.11-2016 standard or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 6 GHz band, the 60 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

The AP 102 may be an example of a first WLAN device 110 for the example retransmission protocols in this disclosure. The STAs 104 may be examples of the second WLAN device 120 in the example retransmission protocols in this disclosure. To be clear, the designations of first WLAN device and second WLAN device may be reversed in other example retransmission protocols. In the example retransmission protocols, the first WLAN device 110 may send HARQ initial transmission 116 to the second WLAN device 120 and the second WLAN device 120 may respond with a first feedback message 118. The HARQ initial transmission 116 may be FEC encoded and include FEC codewords. Based on the first feedback message 118, the first WLAN device 110 may determine to send a HARQ retransmission 126. Typically, the second WLAN device 120 would respond with a second feedback message 148 following the HARQ retransmission 126. However, in accordance with this disclosure, the first WLAN device 110 may transmit an interlaced communication after transmitting the HARQ retransmission 126 and before the second feedback message 148.

The first WLAN device 110 may include a retransmission protocol unit 112 to implement a HARQ retransmission protocol and a PHY transmission unit 114. The retransmission protocol unit 112 may implement a retransmission protocol in accordance with aspects of this disclosure. The retransmission transmission unit 114 may prepare and communicate the HARQ initial transmission 116. The retransmission protocol unit 112 also may store information, such as the FEC codewords and source data, associated with the HARQ initial transmission 116. The second WLAN device 120 may include a retransmission protocol unit 122 and a feedback unit 124. The retransmission protocol unit 122 may implement the retransmission protocol in accordance with aspects of this disclosure. The feedback unit 124 may prepare and communicate the feedback 126. In some instances, the first WLAN device 110 and the second WLAN device 120 may exchange service discovery frames or other management frames to ascertain whether both devices support the retransmission protocol or particular features of the retransmission protocol.

Figure 2:
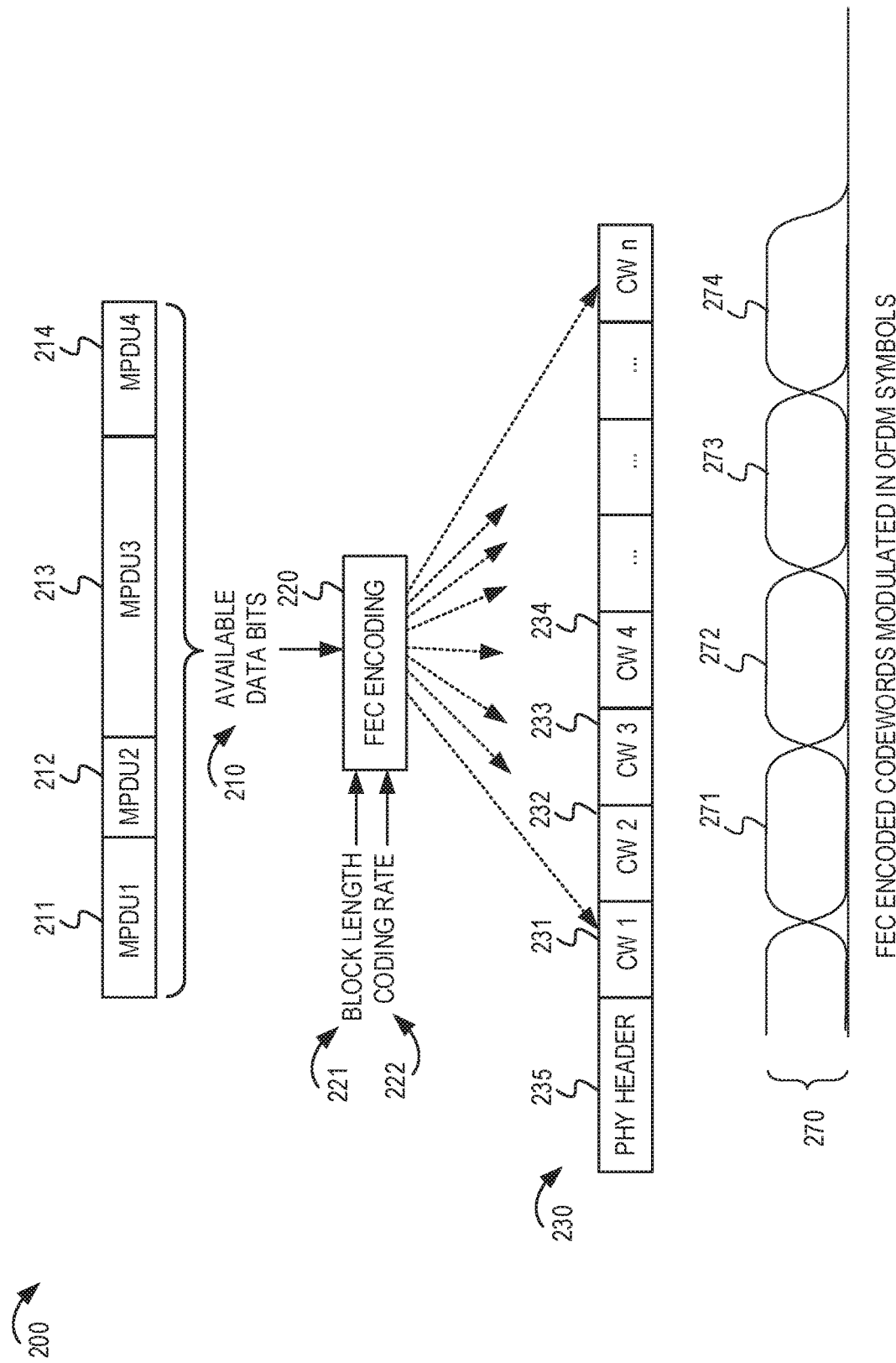
FIG. 2 depicts an example forward error correction (FEC) encoding process to distinguish between media access control (MAC) layer protocol data units (MPDUs) and a physical (PHY) protocol data unit (PPDU) with FEC codewords.

FIG. 2 depicts an example FEC encoding process to distinguish between MAC layer protocol data units (MPDUs) and a PHY protocol data unit (PPDU) with FEC codewords. As an input to the FEC encoding process 200, a series of MPDUs 211, 212, 213, and 214 may be collectively referred to as source data having a series of available data bits 210 for FEC encoding. The FEC encoding process 220 may take blocks of the available data bits 210 based on a block length 221 parameter. Additionally, a coding rate 222 may affect how the FEC encoding process 220 processes the blocks of available data bits 210. For each block of available bits, the FEC encoding process 220 may determine a codeword. The FEC encoding process 220 can be used to populate a PPDU 230 with one or more codewords (such as codewords 231, 232, 233, and 234). A physical layer header 235 also may prepend the codewords. The quantity and length of the codewords (such as the codewords 231, 232, 233, and 244) in the PPDU 230 may be determined based on the number of available data bits 210 and the coding rate 222.

One example FEC encoding process may be based on LDPC encoding. There may be many alternative implementations of FEC encoding. LDPC is generally well known in the art. For example, IEEE Std 802.11-2016 includes a thorough explanation of LDPC encoding. The LDPC encoding may be systematic, such that it encodes an information block, $c=(i0,i1, \ldots, i(k-1))$, of size k, into a codeword, c, of size n, $c=(i0,i1, \ldots i(k-1), p0, p1, \ldots, p(n-k-1))$, by adding n-k parity bits. The parity bits are calculated using LDPC parity-check matrices. Example coding rates, information block lengths, and codeword block lengths are described in Table 1.

TABLE 1

| Coding Rate (R) | LDPC information block length (available bits) | LDPC codeword block length (codeword bits) |
| --- | --- | --- |
| 1/2 | 972 | 1944 |
| 1/2 | 648 | 1296 |
| 1/2 | 324 | 648 |
| 2/3 | 1296 | 1944 |
| 2/3 | 864 | 1296 |
| 2/3 | 432 | 648 |
| 3/4 | 1458 | 1944 |
| 3/4 | 972 | 1296 |
| 3/4 | 486 | 648 |
| 5/6 | 1620 | 1944 |
| 5/6 | 1080 | 1296 |
| 5/6 | 540 | 648 |

The quantity and length of the LDPC codewords (such as the codewords 231, 232, 233, and 244 in the PPDU 230) may be determined based on the number of available data bits 210 and the coding rate 222. Example parameters are described in Table 2.

TABLE 2

| Range of $N_{avbits}$ (bits) | Number of LDPC codewords in PPDU | LDPC codeword length (each codeword) |
| --- | --- | --- |
| $N_{avbits} \leq 648$ | 1 | 1296, if $N_{avbits} \geq N_{pld} + 912 \times (1 - R)$ 648, otherwise |
| $648 < N_{avbits} \leq 1296$ | 1 | 1944, if $N_{avbits} \geq N_{pld} + 1464 \times (1 - R)$ 1296, otherwise |
| $1296 < N_{avbits} \leq 1944$ | 1 | 1944 |
| $1944 < N_{avbits} \leq 2592$ | 2 | 1944, if $N_{avbits} \geq N_{pld} + 2916 \times (1 - R)$ 1296, otherwise |
| $2592 < N_{avbits}$ | $\left\lceil \dfrac{N_{pld}}{1944 \times R} \right\rceil$ | 1944 |

The available data bits may be padded to fill a number of bits in a payload of a PPDU ($N_{pld}$ may be the number of bits in a PSDU and SERVICE field to include in the PPDU). After adding padding (also referred to as shortening bits), the distributed (segmented) into codeword blocks for LDPC encoding and puncturing. For example, parity bits may be added to the data bits and padding. The shortening bits may be discarded after the LDPC encoding. Furthermore, the parity bits may be punctured. Typically, puncturing involves discarding some of the parity bits to reduce the size of the codeword. After puncturing, in some implementations, a first portion of the codeword may be repeated in a last portion of the codeword.

In some implementations, a first WLAN device may store the punctured bits. For example, a parity MPDU may include the punctured bits that were removed from the first set of parity bits. In another implementation, the first WLAN device may use a different coding rate (to generate different parity bits) based on the same source data associated with an FEC codeword. Because the size of the FEC codewords and coding rates are specified (such as Table 1 and Table 2), the first WLAN device and the second WLAN device may use corresponding processes for encoding and decoding, respectively.

The collection of MPDUs (such as MPDUs 211, 212, 213, and 214) may be distributed to different codewords (codewords 231, 232, 233, and 234). The boundaries between MPDUs and codewords may not be aligned. A single codeword may include data from multiple MPDUs. Furthermore, a single MPDU may span multiple codewords. In one aspect of this disclosure, a first WLAN device may maintain a mapping of which MPDUs have been encoded in which codewords. For example, if a second WLAN device indicates that MPDUs 211 and 212 were not properly received while MPDUs 213 and 214 were properly received, the first WLAN device may determine that the second WLAN device was unable to decode the first codeword 231. The first WLAN device may retransmit the first codeword 231 (possibly after puncturing or removing some bits). In some implementations, the first WLAN device may transmit additional parity bits for the first codeword 231 in a subsequent transmission. Furthermore, the subsequent transmission may not include a retransmission of data, but rather may include just the additional parity bits. The second WLAN device may combine the additional parity bits with the first set of parity bits in the first codeword 231 to decode the first 231.

FIG. 2 also shows a relationship between the codewords and physical layer symbols. FEC encoded blocks may be transmitted using a modulation waveform 270 having one or more modulation symbols, such as modulation symbols 271, 272, 273, and 274. In one example, the modulation symbols may comprise orthogonal frequency division multiplexing (OFDM) symbols or other symbols. OFDM is a multicarrier technology in which every OFDM symbol is comprised of many carriers. Each carrier can potentially carry a different number of bits of information depending on the channel quality for the carrier. Each symbol may comprise a group of bits from the PPDU. Depending on the PHY layer configuration, each symbol may include a portion of a codeword, a full codeword, or more than one codeword.

Figure 3:
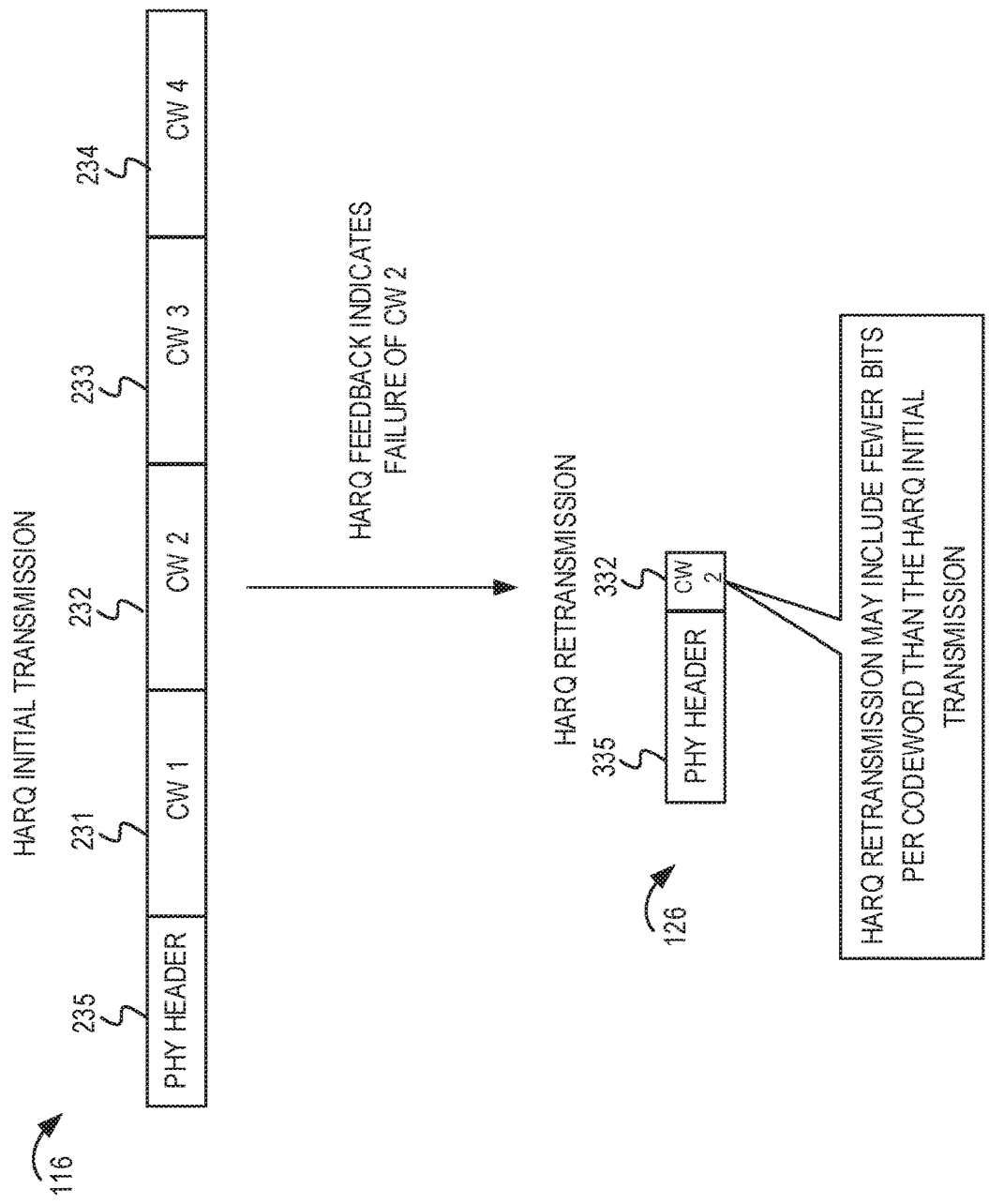
FIG. 3 depicts an example hybrid automatic repeat request (HARQ) protocol and an example difference between a HARQ initial transmission and a HARQ retransmission which may present a challenge for the receiving station (STA).

FIG. 3 depicts an example HARQ protocol and an example difference between a HARQ initial transmission and a HARQ retransmission which may present a challenge for the receiving STA. The HARQ initial transmission 116 may include the PHY and one or more codewords (such as codewords 231, 232, 233, and 234). In some implementations, the codewords (such as codewords 231, 232, 233, and 234) may include 80% of the coded bits (from the FEC encoding process) in the HARQ initial transmission. For example, the FEC codeword generated by the FEC encoding process 220 (FIG. 2) may be punctured so that the codeword 231 contains 80% of the coded bits. Following the HARQ initial transmission 116, the HARQ feedback from the second WLAN device may indicate a failure to decode the second codeword 232. The HARQ retransmission 126 may include a PHY header 335 and a retransmission of the second codeword 332. The retransmitted second codeword 332 may be a punctured version of the second codeword 232 in the HARQ initial transmission 116. However, in this example, only 20% of the coded bits are included in the second codeword 332. In some implementations, the second codeword 332 may be an incremental redundancy transmission (such as additional parity bits with fewer data bits) or may be a punctured chase combining transmission (such that the original second codeword 232 is further punctured).

Current receivers are designed to decode codewords at a specific rate. The codeword processing rate may be based on a highest data rate that the STA supports. However, for a given data rate, the time to transmit the bits for a retransmitted codeword may be less than for standard transmissions when incremental redundancy or punctured chase combining is used. This is because only some of the code bits in the codeword are retransmitted.

The receiving STA may attempt to decode the codewords based on the HARQ initial transmission. If decoding is unsuccessful, the STA may send back a feedback message indicating which codewords need more code bits. However, because the retransmitted code word may have fewer bits, the codeword processing rate would need to be much faster or more decoders would need to be implemented. The codeword processing rate may be limited based on receiver processing capability. The receiver processing capability may be dependent on hardware limitations, memory, or the like. It may not be possible or economically feasible to build the STA having a receiver processing capability that supports the fastest retransmission rate of the HARQ retransmission protocol.

Figure 4:
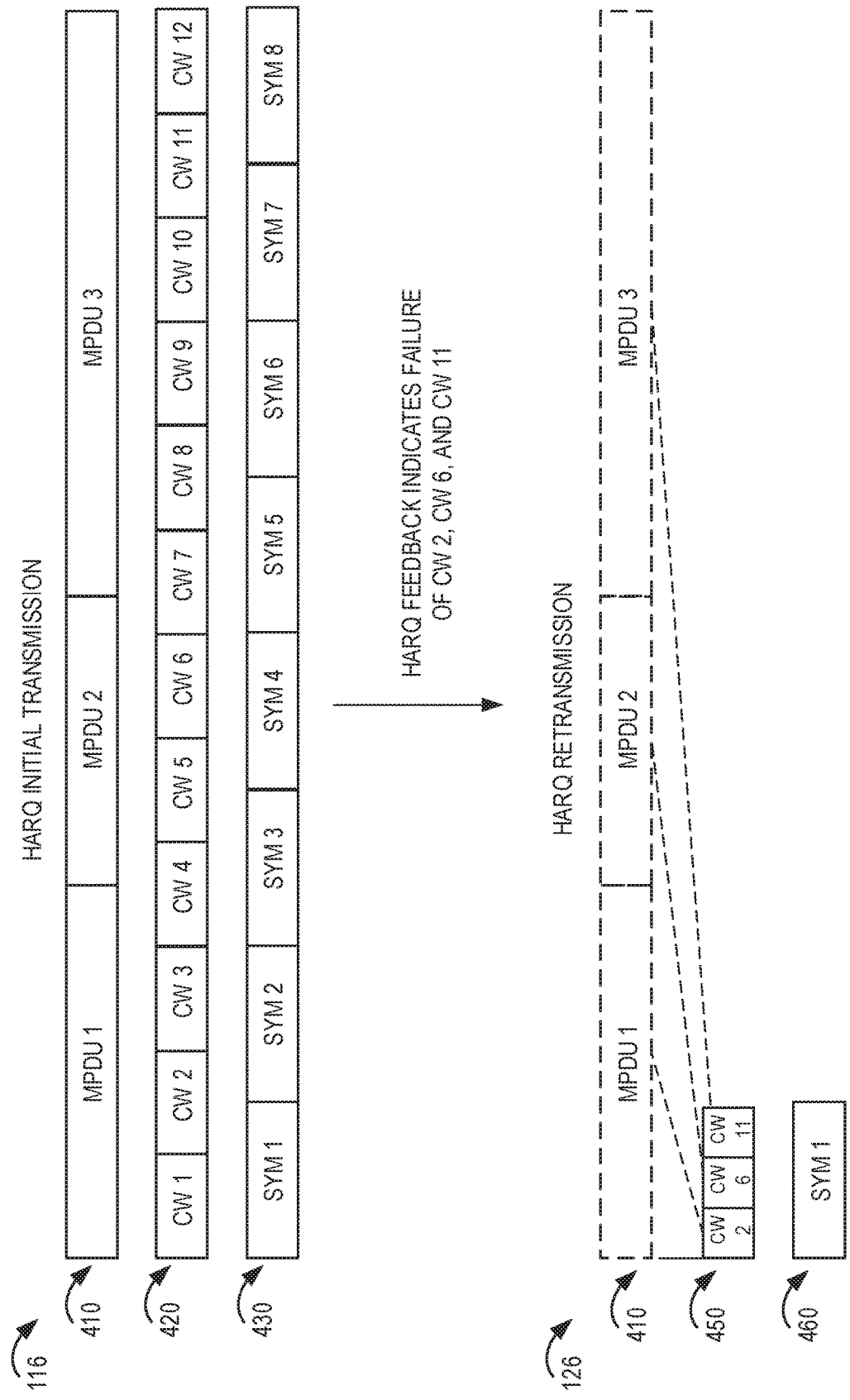
FIG. 4 depicts an example MAC layer processing consideration based on the HARQ protocol.

FIG. 4 depicts an example MAC layer processing consideration based on the HARQ protocol. In addition to the FEC decoding of the codewords based on the HARQ retransmission, the STA also may need time for MAC layer processing. After the PHY layer processes the PPDU, it sends the PSDU to the MAC layer for processing. The MAC layer is designed to "keep up" with the PHY layer. If it is an A-MPDU then the MAC needs to find the delimiters and separate into the individual MPDUs, and then process each MPDU. However, the MAC layer may be unable to keep up when failed codewords are distributed throughout the A-MPDU.

In the example of FIG. 4, several MPDUs 410 are shown. The MPDUs may be different sizes, as shown with MPDU 1, MPDU 2, and MPDU 3. After performing an encoding process (such as the FEC encoding process 220 of FIG. 2), the first WLAN device may generate multiple codewords 420 (shown as codewords 1-12). The codewords may not relate to MPDU boundaries because the encoding process works on blocks of source data and the block length may be unrelated to the size of the MPDUs. Similarly, when the codewords are modulated into OFDM symbols 430, the codewords may not align with the symbol boundaries. In FIG. 4, the codewords 420 are modulated into multiple symbols 430 (shown as SYM 1-8). The HARQ initial transmission 116 may include the codewords 420 modulated via the symbols 430.

The second WLAN device may provide HARQ feedback indicating that codewords 2, 6, and 11 were not properly decoded. The HARQ retransmission 126 may include punctured versions or incremental redundancy versions of the original codewords 2, 6, and 11. As described in FIG. 3, the retransmitted codewords 450 may include fewer bits than the originally transmitted codewords. In the example of FIG. 4, the retransmitted codewords 450 may be included in one symbol 460 (SYM 1). However, as shown by the dashed lines, those retransmitted codewords 450 are related to the different MPDUs 1, 2, and 3.

Turning to the second WLAN device processing of the HARQ retransmission, it may be apparent that the processing capability of the second WLAN device would need to be greater to process the HARQ retransmission in real-time compared to the processing capability to process the HARQ initial transmission. Furthermore, even if the PHY layer of the second WLAN device could keep up with the FEC decoding in real-time, the MAC layer would need time to reassemble the decoded codewords for each PSDU and determine whether the MPDU is properly received.

Figure 5:
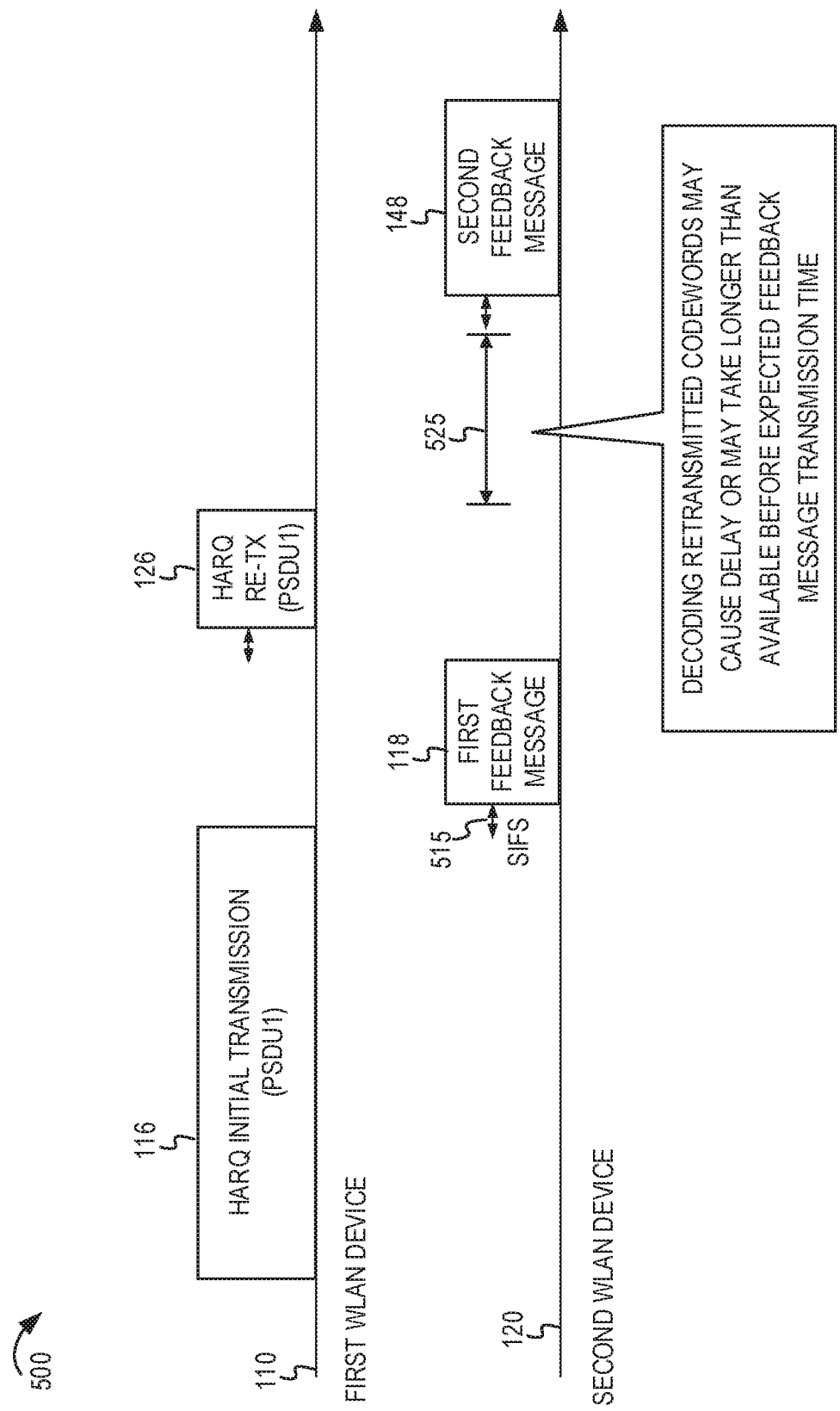
FIG. 5 depicts an example message timing diagram of a legacy retransmission protocol.

FIG. 5 depicts an example message timing diagram of a legacy retransmission protocol. A retransmission process 500 may begin with transmission of a HARQ initial transmission 116 from the first WLAN device 110 to the second WLAN device 120. For example, the HARQ initial transmission 116 may include codewords for a first PSDU (PSDU 1). The HARQ initial transmission 116 may be formatted to indicate that it supports the retransmission protocol. For example, the HARQ initial transmission 116 may include a header, field, or indicator that signals that the HARQ initial transmission 116 is part of the HARQ process. Upon seeing the header, field, or indicator, the second WLAN device 120 may be configured to store one or more of the codewords of the HARQ initial transmission 116 in case they are needed for a subsequent decoding attempt after receiving the HARQ retransmission 126. In some implementations, the HARQ initial transmission 116 may be formatted using a PPDU as described in FIG. 12.

In response to the HARQ initial transmission 116, the second WLAN device 120 may be configured to send a first feedback message 330 back to the first WLAN device 110. The first feedback message 330 may begin after an interframe space 515 (such as a short interframe space (SIFS), a reduced interframe space (RIFS), a PCF interframe space (PIFS)) or the like. Alternatively, the interframe space 515 may be a backoff period before a contention-based access by the second WLAN device 120. In some implementations, the interframe space 515 may represent a determinable time period to maintain synchronization in the WLAN. For brevity in this disclosure and related Figures, the interframe spaces are indicated with small double-headed arrows consistent with the arrow shown for the interframe space 515.

The first feedback message 118 may be one of a variety of different types of feedback messages. For example, the first feedback message 118 may be MAC layer block acknowledgement message, a codeword block acknowledgement message, or a codeword-specific feedback message. In the example of FIG. 5, the first feedback message 118 is a HARQ feedback that indicates which codewords of the HARQ initial transmission 116 the second WLAN device was unable to decode properly. For example, the first feedback message 118 may include a bitmap or other format that indicates which codewords of the HARQ initial transmission 116 were properly decoded or which codewords were not properly decoded. Regardless of the type of feedback message, the first WLAN device 110 may determine which codewords in the HARQ initial transmission 116 were not successfully received or decoded based on the first feedback message 118. In the example of FIG. 5, the first feedback message 330 may suggest to the first WLAN device 110 that a first FEC codeword of the HARQ initial transmission 116 was not successfully decoded by the first WLAN device 110.

In response to a determination that the first FEC codeword was not successfully decoded, the first WLAN device 110 may prepare a HARQ retransmission 126 that includes information corresponding to the first FEC codeword (as well as any other codewords from the HARQ initial transmission 116 that were not successfully decoded by the second WLAN device 120). In some implementations, the HARQ retransmission 126 may include a punctured version of the original FEC codeword or may include different parity bits associated with the original FEC codeword.

Following the HARQ retransmission 126, the second WLAN device 120 may attempt to decode the first FEC codeword (from the HARQ initial transmission 116) using the retransmitted codeword (from the HARQ retransmission 126). For example, the second WLAN device 120 may combine the signals associated with the original and retransmitted codewords before performing signal processing on the codeword. Alternatively, the second WLAN device 120 may use the incremental redundancy information from the retransmitted codeword to decode the original codeword. In some implementations, the first WLAN device 110 may combine a set of parity bits (from the HARQ initial transmission 116) and a second set of parity bits (from the HARQ retransmission 126) into a combined set of parity bits for an FEC decoding process. Following the processing of the HARQ retransmission 126, the second WLAN device 120 may be configured to send a second feedback message 148 to indicate whether the first FEC codeword was successfully decoded. Alternatively, the second feedback message 148 may be a MAC layer acknowledgement for an MDPU included in the PSDU1.

According to the legacy retransmission protocol, the first WLAN device 110 may expect the second feedback message 148 immediately following an interframe space after the HARQ retransmission 126. However, as described in FIGS. 3 and 4, the second WLAN device 120 may not have sufficient receiver processing capability to process the HARQ retransmission 126 before the expected time for the second feedback message 148. Decoding the HARQ retransmission 126 may cause an unexpected delay, which may cause the first WLAN device 110 to assume that the HARQ retransmission 126 was not properly received. In order to process the HARQ retransmission 126 in time to transmit the second feedback message 148 at the expected time, the second WLAN device 120 may require additional decoders, processing capability, memory, or other resources than are unavailable to the second WLAN device 120.

In some implementations, the first WLAN device 110 may reduce its transmission rate based on the receiver processing capability of the second WLAN device 120. For example, the second WLAN device 120 may provide parameters to the first WLAN device 110 as part of an association process or HARQ configuration messaging. The parameters may be indicative of the receiver processing capability, such as a codeword processing rate (such as a quantity of codewords per time unit). If the first WLAN device 110 knows the receiver processing capability, the first WLAN device 110 may limit it's transmit rate to avoid exceeding the codeword processing rate of the second WLAN device 120. For example, the first WLAN device 110 may set a modulation and coding rate (MCS) below an upper limit so that the effective codeword processing rate is below the rate supported by the second WLAN device 120. In some implementations, the first WLAN device 110 may use a lower codeword puncturing rate for the HARQ retransmission 126 (which results in a larger HARQ retransmission 126 size) to ensure that the codeword transmission rate is below the codeword processing rate of the second WLAN device 120.

In some implementations, the retransmission protocol can be enhanced to provide additional time for the second WLAN device 120 to process the HARQ retransmission 126 while making efficient use of the wireless channel. For example, the retransmission protocol may be altered to permit interlacing of other communications while the second WLAN device 120 is processing the HARQ retransmission 126. FIGS. 6-10 describe several alternatives to enhance the retransmission protocol based on the receiver processing capability.

Figure 6:
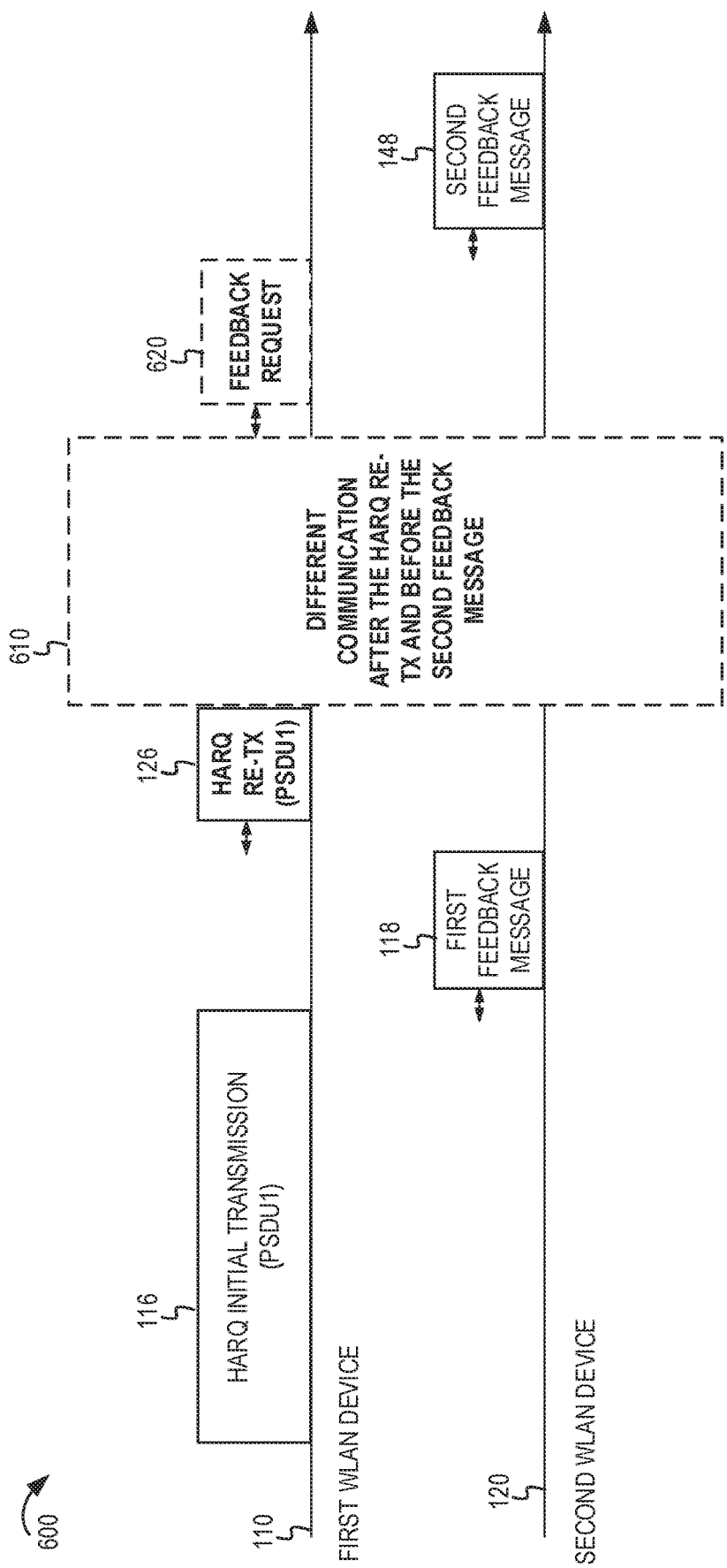
FIG. 6 depicts an example retransmission protocol that supports interlaced communication after a HARQ retransmission and before a second feedback message related to the HARQ retransmission.

FIG. 6 depicts an example retransmission protocol 600 that supports interlaced communication after a HARQ retransmission and before a second feedback message related to the HARQ retransmission. In some implementations, there may be a capability exchange at the time of association or as part of the HARQ process configuration. The capability exchange may inform the first WLAN device 110 about the codeword processing rate supported by the second WLAN device 120. In some implementations, the first WLAN device 110 may use the codeword processing rate to determine a limit on the data rate that the first WLAN device 110 can send to the second WLAN device 120 such that the second WLAN device 120 can process the HARQ initial transmission 116 in real-time. Furthermore, the first WLAN device 110 may use the codeword processing rate to determine an amount of delay that the second WLAN device 120 will need to properly process the HARQ retransmission 126.

As shown in FIG. 6, the first WLAN device 110 may follow the HARQ retransmission 126 with a different communication 610 (which also may be referred to as an interlaced communication). The different communication 610 may include a transmission to another STA (such as a third WLAN device) or may include additional data to the second WLAN device 120. Regardless of the recipient of the different communication 610, the different communication 610 is communicated during a time that the second WLAN device 120 is processing the HARQ retransmission 126. Therefore, the different communication 610 provides time for the second WLAN device 120 to process the codewords and prepare to send the second feedback message 148. The timing for the second feedback message 148 may be delayed until after the different communication 610. The ability to delay the second feedback message 148 may be referred to as a delayed acknowledgement feature of the retransmission protocol. In some implementations, the first WLAN device 110 and the second WLAN device 120 may negotiate the delayed acknowledgement feature capability based on a version of the retransmission protocol implemented by the WLAN devices. As described in FIG. 5, the legacy retransmission protocol may typically be followed by an immediate feedback. WLAN devices that implement the techniques of this disclosure may support both immediate feedback and the delayed acknowledgement feature.

In some implementations, the first WLAN device 110 may use different ways to indicate whether the second WLAN device 120 is instructed to use an immediate feedback or a delayed acknowledgement. For example, a technical standard may include an updated version in which the second WLAN device 120 may respond immediately to the HARQ initial transmission 116 and wait for an explicit feedback request 620 before sending the second feedback message 148. In another alternative, the first WLAN device 110 may be capable of indicating a request for immediate feedback or delayed acknowledgement using a portion (such as a PHY header) of the HARQ initial transmission 116 and the HARQ retransmission 126. The PHY header typically is signaled using a robust signaling, providing greater reliability. In some implementations, the indicator for delayed acknowledgement may be included in the PHY header since the MAC layer of the second WLAN device 120 may not be able to decode the payload based on the channel conditions.

The amount of time used for the different communication 610 may be based on the codeword processing rate of the second WLAN device 120. The first WLAN device 110 may determine whether it has other data to send and whether there is enough time following the HARQ retransmission 126 for the first WLAN device 110 to transmit the different communication 610. The timing for the second feedback message 148 may be further delayed by the first WLAN device 110 to allocate enough time for the first WLAN device 110 to transmit the different communication 610.

In some implementations, the second feedback message 148 may be delayed until the first WLAN device 110 send an explicit feedback request 620 to the second WLAN device 120. An example of the explicit feedback request 620 may include a Block Ack request (BAR) message which would prompt the second WLAN device 120 to send a Block Ack in the second feedback message 148. Alternatively, the explicit feedback request 620 may be an explicit HARQ feedback request message that prompts the second WLAN device 120 to send a HARQ feedback as a follow up to the first feedback message 118. In some implementations, a HARQ feedback is different from a Block Ack in that the HARQ feedback is based on the PHY layer decoding of codewords while the Block Ack is based on the MAC layer processing of MPDUs after the codewords are reassembled and sent to the MAC layer.

In some implementations, the second feedback message 148 may be sent after the different communication 610 without the explicit feedback request 620. For example, the second WLAN device 120 may determine a timing for the second feedback message 148 based on signaling included in the HARQ retransmission 126 or by observing the different communication 610.

Figure 7:
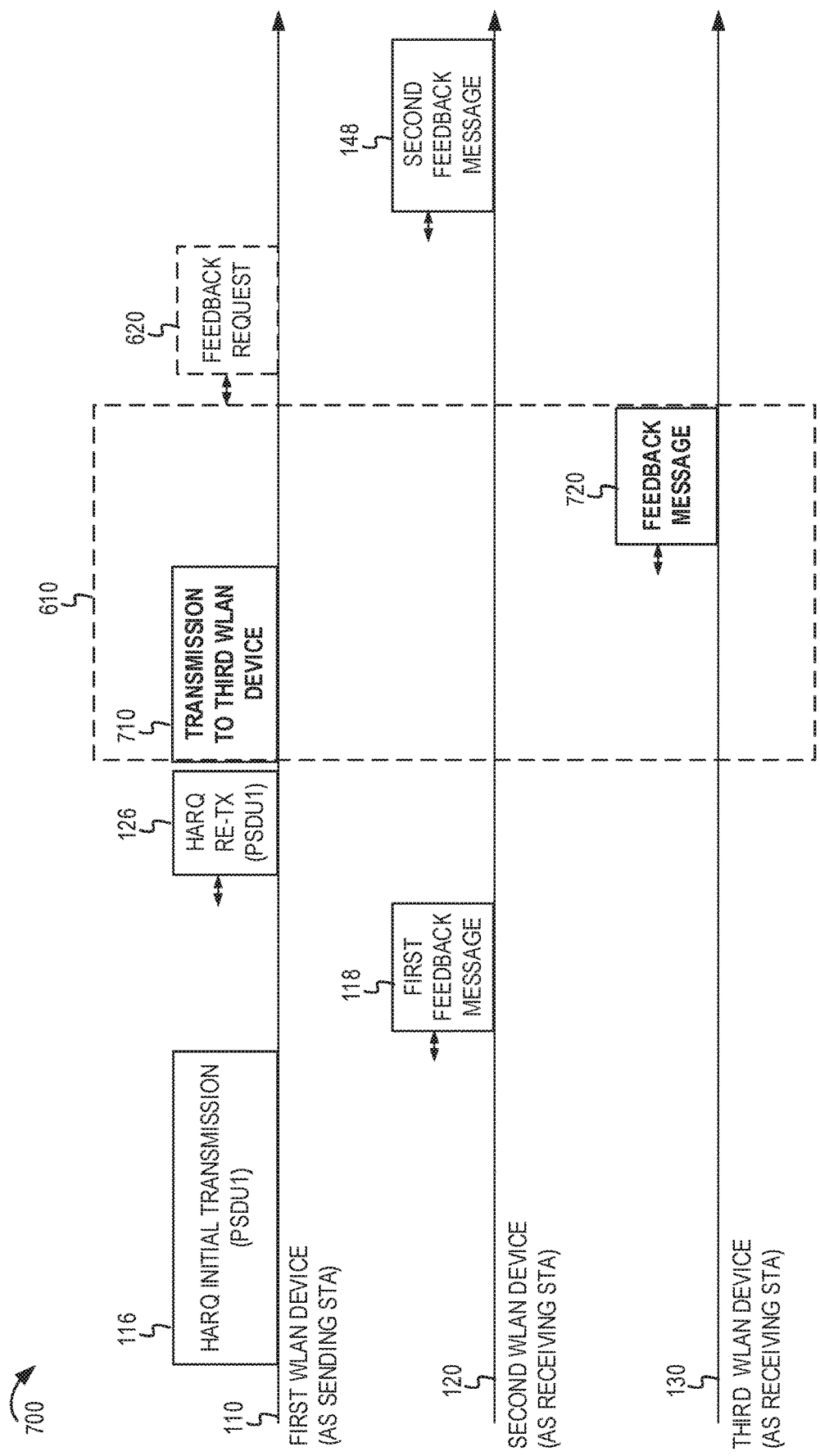
FIG. 7 depicts an example interlaced communication to a third WLAN device in which the second WLAN device refrains from sending a second feedback message until after a feedback request message from the first WLAN device.

FIG. 7 depicts an example interlaced communication to a third WLAN device in which the second WLAN device refrains from sending a second feedback message until after a feedback request message from the first WLAN device. In the example retransmission protocol 700, the HARQ retransmission 126 may be followed by the different communication 610. As shown in FIG. 7, the different communication 610 may include a transmission 710 to the third WLAN device 130. The transmission 710 may be a HARQ or a non-HARQ transmission. The first WLAN device 110 determine whether to use HARQ or non-HARQ for each transmission (including the transmission 710) based on current conditions, available data to send, or other criteria. Following the transmission 710, the third WLAN device 130 may be configured to send a feedback message 720. For example, the transmission 710 may be a HARQ initial transmission to the third WLAN device 130 and the feedback message 720 may be a HARQ feedback that immediately follows the transmission 710.

As described in FIG. 6, the first WLAN device 110 may send an explicit feedback request 620 to prompt the second WLAN device 120 to send the second feedback message 148. The time associated with the different communication 610 may be long enough such that the second WLAN device 120 can decode the codewords using the HARQ retransmission 126, process the MAC layer acknowledgement and prepare the second feedback message 148 while the first WLAN device 110 and the third WLAN device 130 are communicating.

Figure 8:
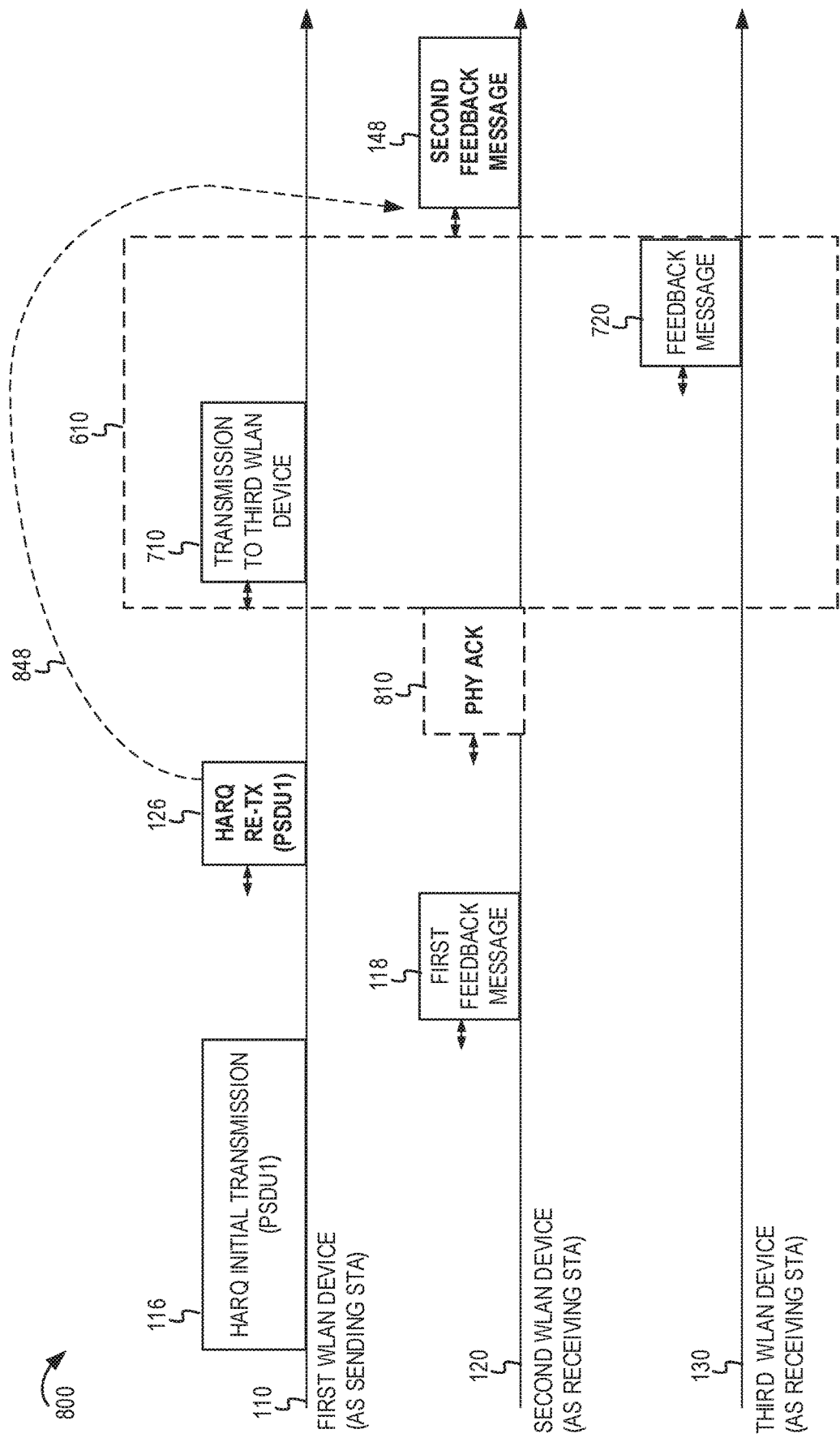
FIG. 8 depicts an example interlaced communication to a third WLAN device in which the second WLAN device provides a PHY acknowledgement and then sends the second feedback message at a time determined by a header of the HARQ retransmission.

FIG. 8 depicts an example interlaced communication to a third WLAN device in which the second WLAN device provides a PHY acknowledgement and then sends the second feedback message at a time determined by a header of the HARQ retransmission. The example retransmission protocol 800 is similar to the retransmission protocol 700 described in FIG. 7. Two additional optional features are further introduced in FIG. 8. Although both are described in FIG. 8, the two features may be used independently or together in various implementations.

In some implementations, the retransmission protocol 800 may include a PHY acknowledgement feature. For example, the retransmission protocol 800 may include a PHY acknowledgement 810 from the second WLAN device 120 to the first WLAN device 110 following the HARQ retransmission 126. The PHY acknowledgement 810 also may be referred to as a "PHY Preamble ACK" which just notifies the first WLAN device 110 that second WLAN device 120 has properly received the PHY Preamble of the HARQ retransmission 126. This feature may be useful to inform the first WLAN device 110 that the second WLAN device 120 received the second WLAN device 120, while still providing additional time for the second WLAN device 120 to process the payload of the HARQ retransmission 126. If the first WLAN device 110 does not receive the PHY Preamble ACK, the first WLAN device 110 may retransmit the HARQ retransmission 126 (not shown). Following the PHY acknowledgement 810, the first WLAN device 110 may transmit the different communication 610 as previously described.

In some implementations, the retransmission protocol 800 may include a scheduled acknowledgement feature. For example, the first WLAN device 110 may instruct the second WLAN device 120 about a timing or scheduling for the second feedback message 148. For example, the HARQ retransmission 126 may indicate a time parameter 848 that the second WLAN device 120 can use to determine when to send the second feedback message 148. In some implementations, the time parameter may be signaled in the PHY Preamble or other field of the HARQ retransmission 126. The first WLAN device 110 may be able to determine the time parameter based on the codeword processing rate and how much time the second WLAN device 120 will need for processing. The time parameter also may be based on how much time the first WLAN device 110 expects to be transmitting the different communication 610. By using a scheduled time for the second feedback message 148, the retransmission protocol 800 may eliminate overhead associated with an explicit feedback request (such as the explicit feedback request 620 described in FIG. 6). In some implementations, the time parameter may be based on a quantity of time units, such as the IEEE 802.11 Time Unit (TU).

Figure 9:
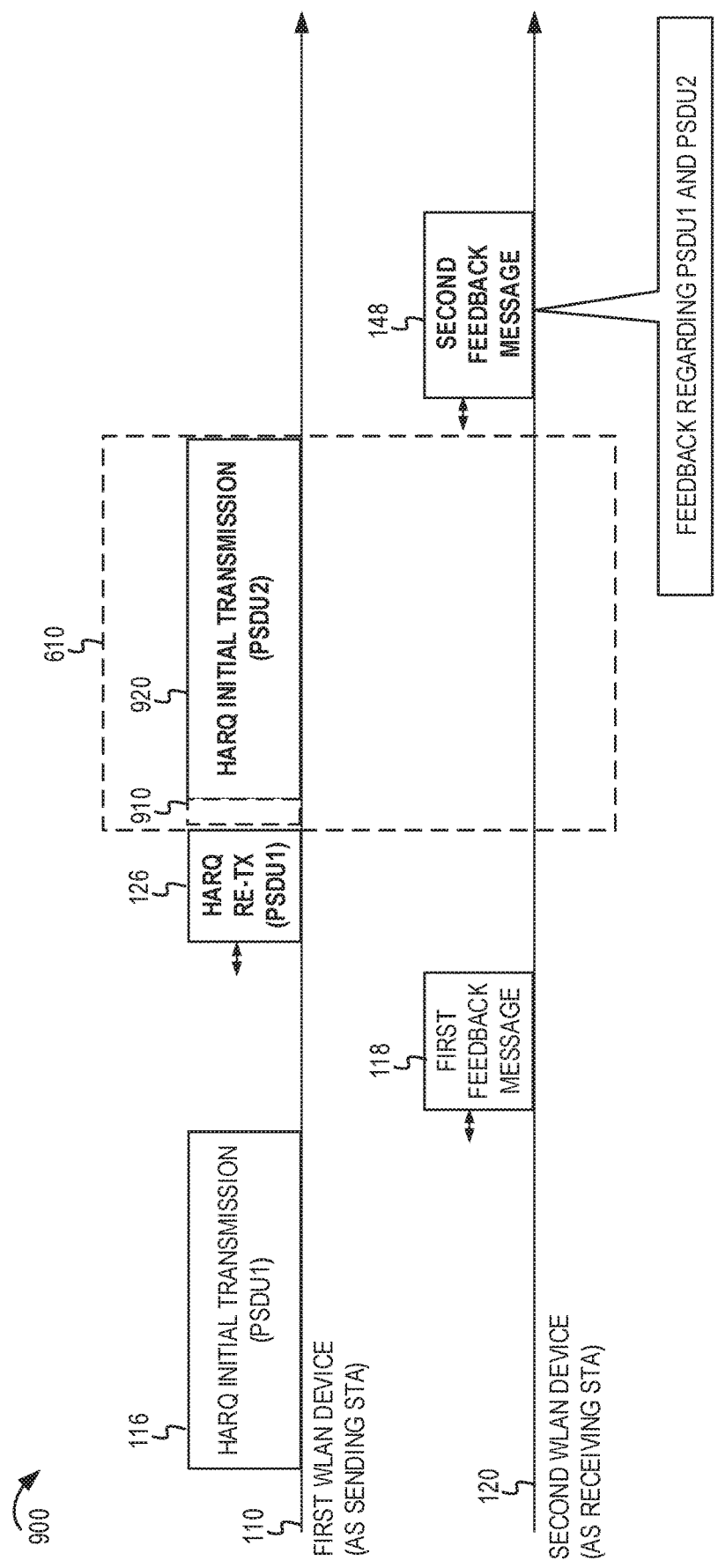
FIG. 9 depicts an example interlaced communication that includes a new HARQ initial transmission to the second WLAN device.

FIG. 9 depicts an example interlaced communication that includes a new HARQ initial transmission to the second WLAN device. The retransmission protocol 900 is similar to those described in the previous Figures, except that the different communication 610 includes additional data for the second WLAN device 120. FIG. 9 shows that the different communication 610 may include the next HARQ initial transmission 920 for the next block of data. For example, the HARQ initial transmission 116 and the HARQ retransmission 126 may include the codewords associated with a first PSDU (PSDU1) or first group of codewords. The HARQ initial transmission 920 may include codeword associated with a second PSDU (PSDU2) or a second group of codewords.

In some implementations, the HARQ retransmission 126 for one PSDU may be aggregated with the HARQ initial transmission 920 for another PSDU. For example, a single PPDU may carry both the HARQ retransmission 126 and the next HARQ initial transmission 920. As an example, if the PSDUs (PSDU1 and PSDU2) are of the same length, then the aggregation of the HARQ retransmission 126 (for PSDU1) and the HARQ initial transmission (for PSDU2) may take approximately the same time as a non-HARQ transmission with the same PSDU length. However, there are codewords for two PSDUs to decode. The codeword processing rate may be approximately double what it would take for a non-HARQ transmission but may still be within the receiver processing capability of the second WLAN device 120. Furthermore, this may be useful where the codeword processing rate can decode the combined the HARQ retransmission 126 (for PSDU1) and the HARQ initial transmission (for PSDU2).

The example of FIG. 9 shows a time domain aggregation of the HARQ retransmission 126 (for PSDU1) and the HARQ initial transmission (for PSDU2). However, there may be several methods that can be used to aggregate a HARQ retransmission of one PSDU with a HARQ initial transmissions of another PSDU. The time domain aggregation may include the HARQ retransmission of the first PSDU followed by the HARQ initial transmission of the second PSDU. This approach allows for a large dynamic range in the ratio of the number of bits in the HARQ retransmission of the first PSDU and the HARQ initial transmission of the second PSDU. In some implementations, the frequency domain aggregation may be used with OFDMA wireless channels in which different resource units (RUs) may be assigned for the HARQ retransmission of the first PSDU and the HARQ initial transmission of the second PSDU. This approach may not allow for as large a dynamic range in the ratio of the two transmissions. In some implementations, spatial domain aggregation may utilize MIMO and may assign the HARQ retransmission of the first PSDU to one set of spatial streams and the HARQ initial transmission of the second PSDU to another set of spatial streams.

In a retransmission protocol that supports aggregation of a HARQ retransmission of a first PSDU with the HARQ initial transmission of a second PSDU, there may be signaling to distinguish the format of a PPDU from other PPDUs used for the HARQ protocol. For example, three possible types of HARQ PPDUs may include 1) a PPDU with just a HARQ initial transmission, 2) a PPDU with just a HARQ retransmission, or 3) a PPDU with an aggregation of a HARQ retransmission of one PSDU and a HARQ initial transmission of another PSDU. Signaling in a header of the PPDU may indicate which type of HARQ PPDU is being sent. For example, two or more bits in the PHY preamble may indicate the format of the HARQ PPDU. In some implementations, existing bits of a PHY preamble may be repurposed to indicate the type of HARQ PPDU.

In some implementations, the second feedback message 148 may include an aggregation of feedback, including possibly different feedback types. For example, the second feedback message 148 in FIG. 9 includes feedback regarding the PSDU1 and the PSDU2. In some implementations, the second feedback message 148 may include a HARQ feedback regarding the next HARQ initial transmission 920 combined with a Block Ack feedback regarding the HARQ initial transmission 116 (with the HARQ retransmission 126). In some implementations, such as when the next HARQ initial transmission 920 resulted in a successful decoding of the codewords and MAC layer processing, the second feedback message 148 may include a Block ACK for both the PSDU1 and the PSDU2.

Aggregating HARQ transmissions from multiple PSDUs can be used to lower the codeword processing rate of the second WLAN device 120 because the next HARQ initial transmission 920 provides extra time for the codeword processing. This approach may increase the throughput to a single STA while still managing the data throughput based on the receiver processing capability (indicated by the codeword processing rate) of the second WLAN device 120.

In some implementations, the first WLAN device 110 may determine the codeword processing rate of the second WLAN device 120. For example, the first WLAN device 110 and the second WLAN device 120 may exchange their codeword processing rate at association or during HARQ configuration. The first WLAN device 110 may prepare the HARQ PPDU with an aggregated HARQ retransmission and HARQ initial transmission such that the HARQ process will not exceed the codeword processing rate of the second WLAN device 120. In some implementations, combining the HARQ transmissions into one HARQ PPDU may reduce the overhead related to interface space and redundant PHY preambles. The use of combined HARQ feedback and Block ACK into a single PPDU (for the second feedback message 148) also may reduce overhead.

In some implementations, the first WLAN device 110 may dynamically determine whether the different communication 610 will include a transmission for the second WLAN device 120 or for another STA (such as the third WLAN device). The delimiter 910 (or another PHY preamble, not shown) at the start of the different communication 610 may indicate whether the different communication 610 is directed to the second WLAN device 120 or to another WLAN device.

Figure 10:
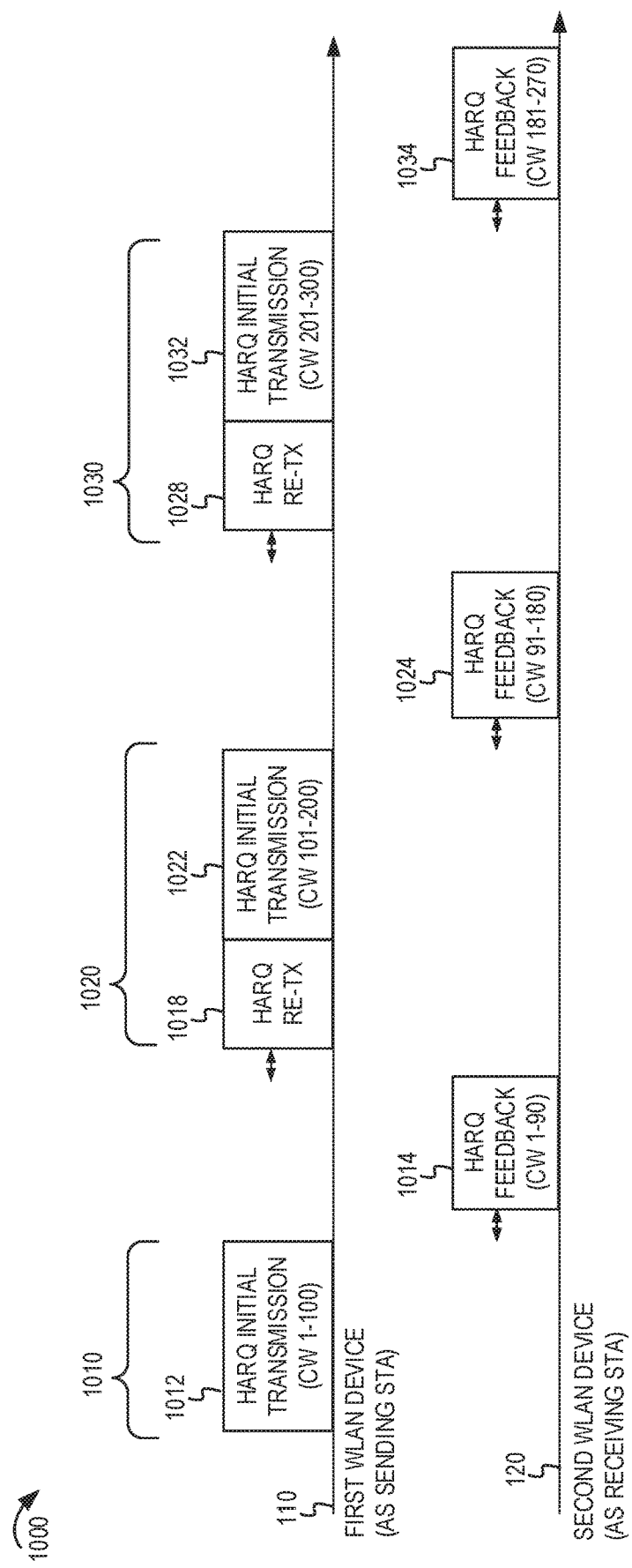
FIG. 10 depicts an example retransmission protocol that supports aggregated HARQ initial transmission and HARQ retransmission using groups of FEC codewords.

FIG. 10 depicts an example retransmission protocol that supports aggregated HARQ initial transmission and HARQ retransmission using groups of FEC codewords. The retransmission protocol 1000 uses aggregated HARQ retransmission and HARQ initial transmission as described in FIG. 9. However, different from FIG. 9, in the retransmission protocol 1000 the HARQ feedback may be based on a window size that is different from the HARQ transmission size.

The first WLAN device 110 may divide a source data (such as a PSDU or a stream of PSDUs) into groups of codewords. In the example of FIG. 10, each group may include 100 codewords. A first HARQ PPDU 1010 may include the HARQ initial transmission 1012 for codewords 1-100. Following the first HARQ PPDU 1010, the second WLAN device 120 may transmit a first HARQ feedback message 1014. The first HARQ feedback message 1014 may indicate the processing result for a portion of the codewords 1-100. For example, the first HARQ feedback message 1014 may include HARQ feedback for codewords 1-90. Note that the window for the HARQ feedback may be different (such as smaller) than the quantity of codewords included in the HARQ initial transmission 1012. This is to provide additional time for the second WLAN device 120 to process the last codewords in the HARQ initial transmission 1012—the feedback for which will be included in a subsequent HARQ feedback message.

In a second HARQ PPDU 1020, the first WLAN device 110 may transmit the HARQ retransmission 1018 for any failed codewords indicted in the first HARQ feedback message 1014 as well as the HARQ initial transmission 1022 for the next group of codewords 101-200. The second WLAN device 120 may transmit HARQ feedback for codewords 91-180, in a second HARQ feedback message 1024. Following the second HARQ feedback message 1024, the first WLAN device 110 may transmit a third HARQ PPDU 1030 that includes the HARQ retransmission 1028 for any failed codewords indicated in the second HARQ feedback message 1024, as well as the HARQ initial transmission 1032 for the next group of codewords 201-300.

The retransmission protocol 1000 shown in FIG. 10 makes use of aggregated HARQ retransmissions and HARQ initial transmissions and enables more time for the second WLAN device 120 to process the retransmitted codewords before providing feedback for them. For example, the codeword processing rate of the second WLAN device 120 may support processing the HARQ retransmission 1018 before the second HARQ feedback message 1024 when the HARQ initial transmission 1022 is included. The HARQ initial transmission 1022 may provide the additional time for the second WLAN device 120 to process the HARQ retransmission 1018.

Another feature of FIG. 10 is that the HARQ feedback that follows each HARQ initial transmission may use a sliding window that moves the feedback for some codewords to a later HARQ feedback message. This may be useful, for example, when the codeword processing rate of the second WLAN device 120 is slower than the codeword transmission rate but the second WLAN device 120 has enough memory to buffer the codewords.

After the last HARQ retransmission (not shown), the first WLAN device 110 may interlace communication with another WLAN device to provide time for the second WLAN device 120 to catch up with the codeword processing before sending the last HARQ feedback (or Block Ack).

Figure 11:
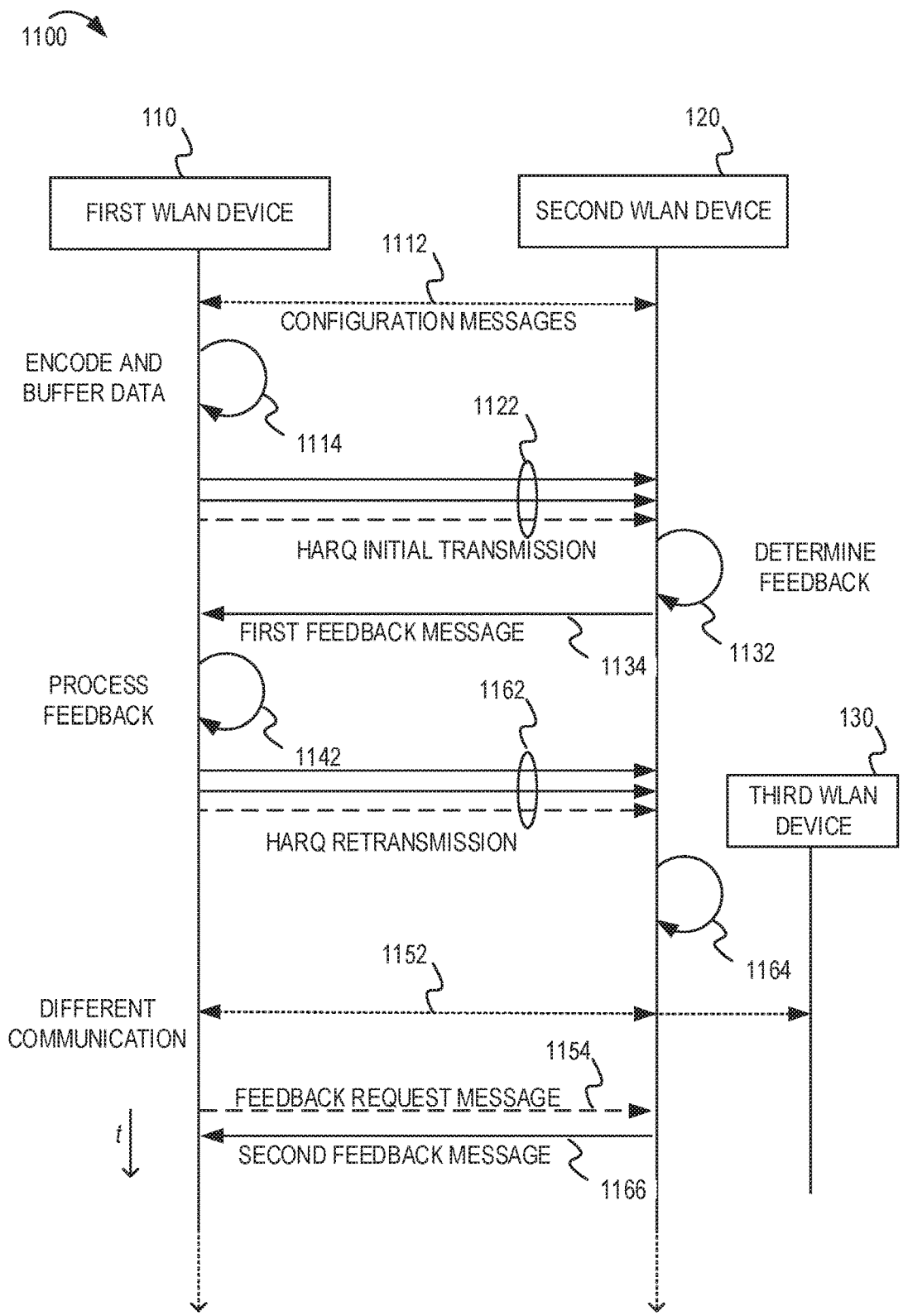
FIG. 11 depicts an example message flow diagram associated with an example retransmission protocol.

FIG. 11 depicts an example message flow diagram associated with an example retransmission protocol. The example message flow 1100 shows the first WLAN device 110 and the second WLAN device 120. The first WLAN device 110 and the second WLAN device 120 may exchange configuration messages 1112 to setup the retransmission protocol. In some implementations, the configuration may be set ahead of time and reused for communications. As an example, the configuration messages 1112 may include messages to setup a MAC layer block acknowledgement protocol (such as ADD Block Ack (ADDBA) request and response messages).

In some implementations, the configuration messages 1112 may include a negotiation of the codeword processing rate supported by the second WLAN device 120. The codeword processing rate may be an example of one parameter that describes the receiver processing capability of the second WLAN device 120. The configuration messages 1112 may include other parameters related to the receiver processing capability (in addition to or in lieu of the codeword processing rate). For example, the parameters may indicate a memory buffer size, quantity of FEC decoders, or other hardware characteristics of the second WLAN device 120. In some implementations, the configuration messages 1112 may include indicators to indicate whether the WLAN devices support a delayed acknowledgement feature of the retransmission protocol. For example, the configuration messages 1112 may indicate support for a version of the retransmission protocol that utilizes the delayed acknowledgement feature.

At process 1114, the first WLAN device 110 may encode and buffer a first set of data. A HARQ initial transmission 1122 (which may be referred to as an original transmission) may include multiple MPDUs or segments of the first set of data. At process 1132, the second WLAN device 120 may attempt to decode the HARQ initial transmission 1122 and may prepare a first feedback message 1134 to send back to the first WLAN device 110. At process 1142, the first WLAN device 110 may process the first feedback message 1134 and determine to retransmit at least one codeword (or an incremental redundancy version of the codeword) from the HARQ initial transmission 1122.

At process 1146, the first WLAN device 110 may prepare the HARQ retransmission 1162. For example, the HARQ retransmission 1162 may include additional parity bits, a punctured version of the codeword, or other information to assist the second WLAN device 120 to decode the failed codeword from the original transmission. In one aspect, the HARQ retransmission 1162 differs from traditional retransmission protocols in that the HARQ retransmission 1162 is based on FEC codewords (at the physical layer) rather than PDUs associated with a higher protocol layer.

Following the HARQ retransmission 1162, the second WLAN device 120 may combine the HARQ retransmission 1162 with the HARQ initial transmission 1122 to decode (shown at process 1164) the first FEC codeword. However, as described in this disclosure, the codeword processing rate of the second WLAN device 120 may be such that the second WLAN device 120 needs more time to process the combined HARQ transmissions. Therefore, the first WLAN device 110 may transmit a different communication 1152 (such that it is interlaced between the HARQ retransmission 1162 and the second feedback message 1116). The different communication 1152 may be directed to the second WLAN device 120 or a third WLAN device 130.

After the different communication 1152, the second WLAN device 120 may send a second feedback message 1166 to indicate whether the first FEC codeword was successfully decoded. In some implementations, the second feedback message 1166 may be prompted by a feedback request message 1154.

Figure 12:
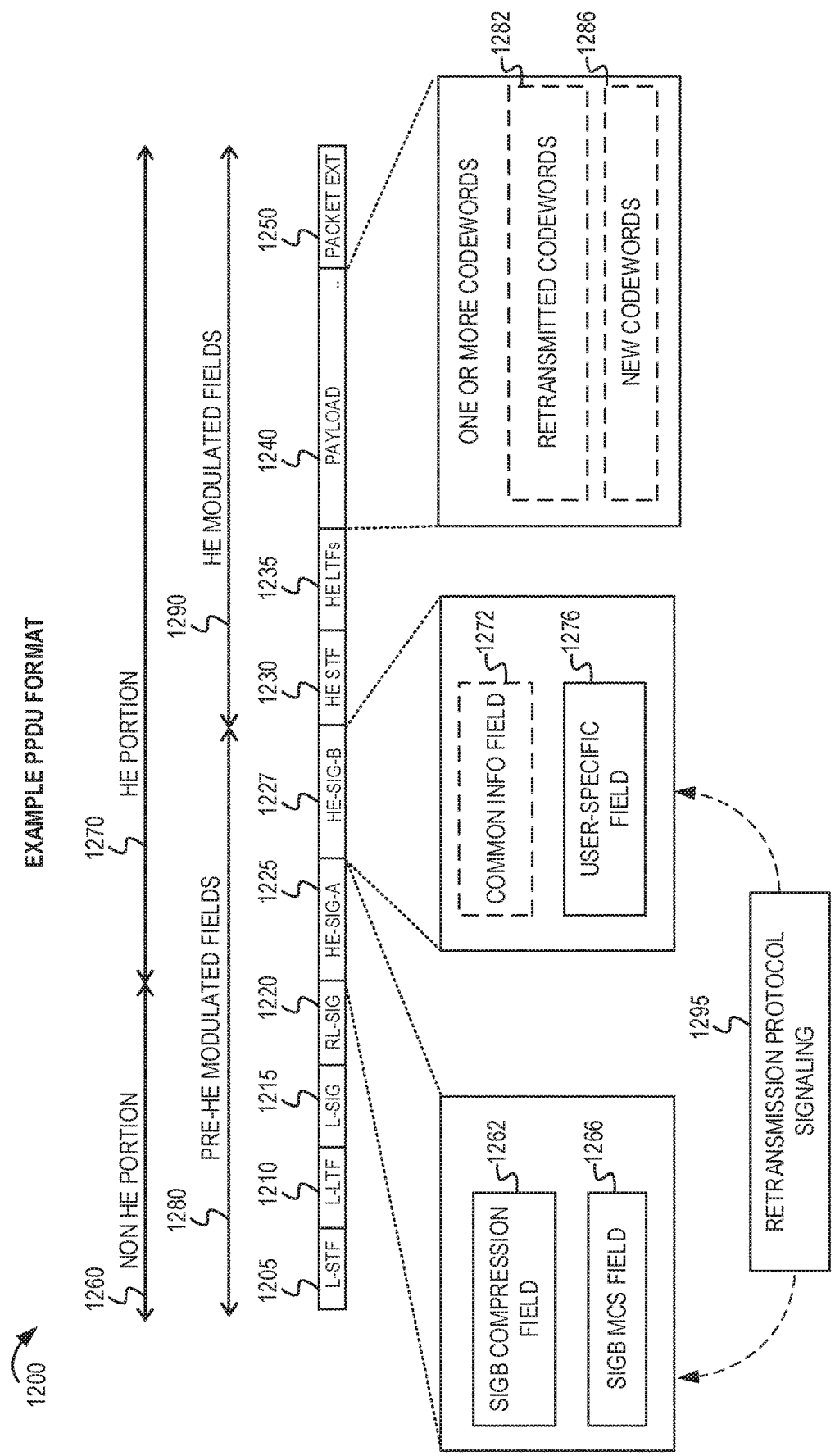
FIG. 12 depicts an example PPDU format for use with aspects of this disclosure.

FIG. 12 depicts an example PPDU format for use with aspects of this disclosure. The PPDU format 1200 may be used for a HARQ PPDU that includes interlaced communications. In some implementations, the example PPDU format 1200 may be based on a high-efficiency (HE) multi-user (MU) PPDU format defined in IEEE 802.11ax draft standard. Other example HARQ PPDU formats may be based on similar formats defined for IEEE 802.11be or beyond. Although the HE MU PPDU format is typically used to aggregate communications to multiple STAs, in some implementations the HE MU PPDU may be used to communicate with a single STA. In some implementations, the PPDU format 1200 may repurpose some fields of the HE MU PPDU format. The PPDU format 1200 may be modified to support the aspects of this disclosure. In some implementations, the PPDU format 1200 may be modified to support an aggregation of a HARQ retransmission with a HARQ initial transmission, both to a single WLAN device identified in a header of the PPDU format 1200. In some implementations, the PPDU format 1200 may be modified, extended, or redefined to support a retransmission protocol such as those described in this disclosure. For example, predetermined values may be defined for some fields of the HE MU PPDU format to cause a second WLAN device to identify a MU-PPDU as one of different types of HARQ PPDUs.

In addition to identifying the PPDU as a retransmission protocol PPDU, it may be desirable for a second WLAN device to determine whether the HARQ PPDU is intended for it. For example, a header of the retransmission protocol PPDU may include a first identifier associated with the first WLAN device and a second identifier associated with the second WLAN device. Although identifiers of the first WLAN device and second WLAN device may be included in a header of an MPDU encapsulated within the payload 1240 of the PPDU format 1200, in some implementations, the first WLAN device may use an unencoded portion of the PPDU header to identify the second WLAN device or the first WLAN device.

Turning to the example PPDU format 1200, each field and portion will be briefly described. A non-HE portion 1260 includes a legacy short training field 1205 (L-STF), a legacy long training field 1210 (L-LTF), and a legacy signal field 1215 (L-SIG). The remaining portion of the PPDU is considered an HE modulated portion 1270 because it includes features that are relevant to devices capable of HE transmissions. The pre-HE modulated fields 1280 include the non-HE portion 1260 as well as some fields to bootstrap the HE modulated fields 1290. For example, the pre-HE modulated fields 1280 may further include a repeated legacy signal field 1220 (RL-SIG), a first HE signal field 1225 (HE-SIG-A), and a second HE signal field 1227 (HE-SIG-B). The repeated legacy signal field 1220 and the first HE signal field 1225 may be modulated using a more reliable (robust) modulation than has lower throughput than the modulation scheme using for the HE modulated fields 1290.

The HE modulated fields 1290 includes an HE short training field 1230 (HE STF), one or more symbols for an HE long training field 1235 (HE LTF), a payload 1240, and may include a packet extension field 1250. The HE modulated fields 1290 is modulated using inverse fast Fourier transform (IFFT) to convert the signal to orthogonal carrier transmissions in the time domain. The payload 1240 may include FEC-encoded codewords. For example, the payload 1240 may include retransmitted codewords 1282 (for a HARQ retransmission) and new codewords 1286 (for a HARQ initial transmission).

The HE-SIG-A may include fields such as a SIGB Compression field 1262 and a SIGB MCS field 1266. There may be other fields (not shown) in the HE-SIG-A. A value of "1" in the SIGB Compression field 1262 may be used to indicate a short format for the HE-SIG-B field, such as when the HARQ PPDU is being sent to a single user. When the SIGB Compression field 1262 indicates "1," a common information field 1272 may be eliminated from the HE-SIG-B field to reduce overhead. The HE-SIG-B field may include one or more user-specific fields 1276. In the example where the HARQ PPDU is being sent to a single user, there may be only one user-specific field 1276.

In some implementations, the PPDU format 1200 may include retransmission protocol signaling 1295 in the PHY header, such as in the HE-SIG-A, the HE-SIG-B, or both. For example, to help the second WLAN device identify the PPDU as a HARQ PPDU, the PHY header may include retransmission protocol indicator. The retransmission protocol indicator may be included in the HE-SIG-A or the HE-SIG-B, or both. Furthermore, there may be different ways to include a retransmission protocol indicator. In some implementations, the retransmission protocol indicator may be represented by a combination of predetermined values in the fields of a HE MU PPDU format. Another alternative for the retransmission protocol indicator may use a reserved bit in the user-specific field 1276. There may be other ways to represent the retransmission protocol indicator in the PPDU.

Other retransmission protocol signaling 1295 may be included in the PPDU format 1200. For example, signaling in the PHY header may be used to indicate whether the second WLAN device should use immediate feedback or the delayed acknowledgement feature. In some implementations, the PHY header may be prepared to inform the second WLAN device that the HARQ PPDU will be followed by interlaced communications. In some implementations, the HARQ PPDU may include the interlaced communication aggregated in the same PPDU with a HARQ retransmission to the second WLAN device. Signaling in the PHY header of the PPDU may indicate the presence of the interlaced communications in the PPDU.

In some implementations, the retransmission protocol signaling 1295 may prompt the second WLAN device to send a PHY preamble Ack in response to the HARQ PPDU and to delay the second feedback message (such as a HARQ feedback or BA feedback) until a later time. In some implementations, the retransmission protocol signaling 1295 may indicate a timing for the second feedback message.

Figure 13A:
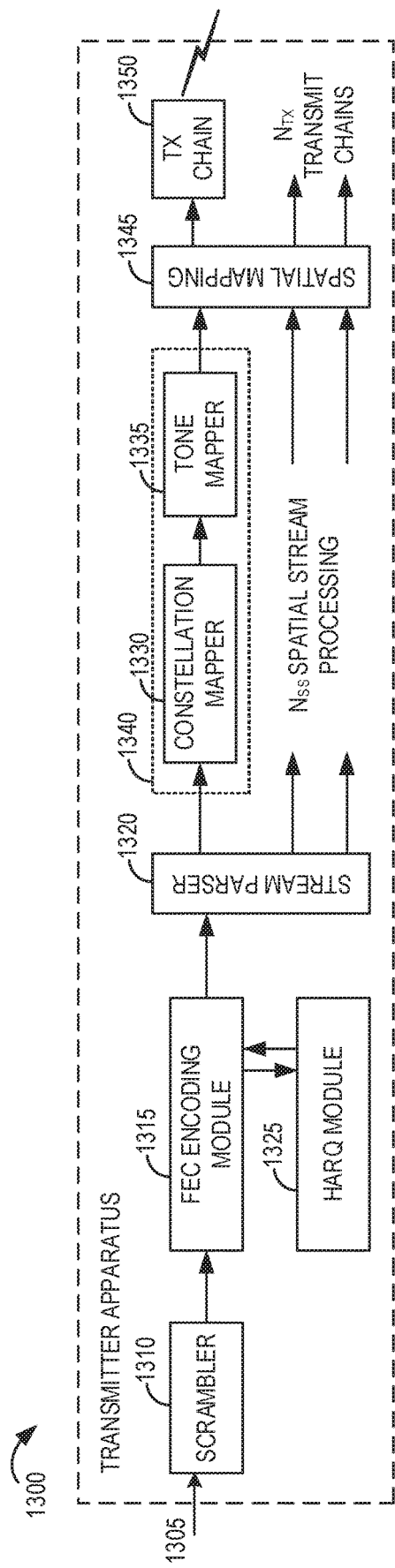
FIG. 13A depicts a block diagram of an example transmitter apparatus for a first WLAN device that supports an example retransmission protocol using incremental redundancy.

FIG. 13A depicts a block diagram of an example transmitter apparatus for a first WLAN device that supports an example retransmission protocol using incremental redundancy. The example transmitter apparatus 1300 shows some of the functional blocks in a first WLAN device (such as the first WLAN device 110 described herein). The example transmitter apparatus 1300 is one of many designs for a transmitter. In this figure, the example transmitter apparatus 1300 is designed for LDPC encoding. In the design described in FIG. 13A, source data 1305 may be processed by a scrambler 1310 and an FEC encoding module 1315. The scrambler 1310 may scramble the source data 1305 to reduce the probability of long sequences of zeros or ones. The FEC encoding module 1315 may perform encoding for error correction and error detection. For example, the FEC encoding module 1315 may perform FEC and add redundancy or CRC bits to the source data. A HARQ module 1325 may maintain a mapping between the scrambled source data and the output of the FEC encoding module 1315. Furthermore, the HARQ module 1325 may store the codeword, punctured parity bits, or other information generated by the FEC encoding module 1315.

In accordance with this disclosure, the HARQ module 1325 may be configured to interlace communication after a HARQ retransmission. The HARQ module 1325 may prepare the HARQ retransmission and determine the amount of time following the HARQ retransmission that can be used for an interlaced communication. Furthermore, the HARQ module 1325 may add the retransmission protocol signaling to the HARQ PPDU to inform the second WLAN device 120 regarding the features implemented according to aspects of this disclosure.

The encoded data may be sent to a stream parser 1320 that divides the encoded data into $N_{SS}$ spatial streams. In some implementations, there may only be one spatial stream and the stream parser 1320 may be unused or non-existent. An example of spatial stream processing 1340 may include a constellation mapper 1330 and a tone mapper 1335. The constellation mapper 1330 maps the sequence of bits in each spatial stream to constellation points (complex numbers). The constellation mapper 1330 may perform the modulation of the bits based on an MCS that defines the constellation points. The tone mapper 1335 may translate the output from the constellation mapper 1330 to the frequencies used for the transmission.

After the spatial streams are processed, a spatial mapping 1345 may map space-time streams to $N_{TX}$ transmit chains (including TX chain 1350). There may be different ways of mapping the streams to transmit chains. For example, in a direct mapping the constellation points from each space-time stream may be mapped directly onto the transmit chains (one-to-one mapping). Another example may use spatial expansion, in which vectors of constellation points from all the space-time streams are expanded via matrix multiplication to produce the input to all of the transmit chains. The spatial mapping 1345 may support beamforming (like spatial expansion), in which each vector of constellation points from all of the space-time streams is multiplied by a matrix of steering vectors to produce the input to the transmit chains.

Each TX chain 1350 may prepare a plurality of OFDM symbols based on the constellation points. For example, the TX chain 1350 may include an inverse discrete Fourier transform (IDFT) that converts a block of constellation points to a time domain block. The TX chain 1350 may include a cyclic shift (CSD), guard interval inserter, and an analog front end to transmit OFDM symbols as radio frequency (RF) energy.

The transmitter apparatus 1300 described in FIG. 13A is only one example of a transmitter apparatus. Other block diagrams may add or remove functional blocks.

Figure 13B:
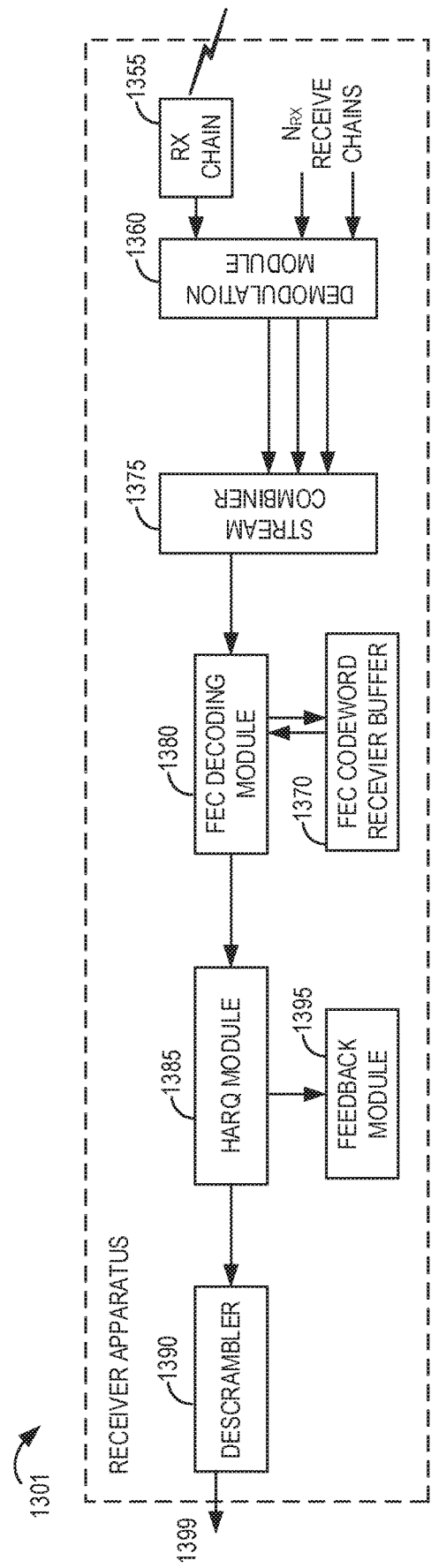
FIG. 13B depicts a block diagram of an example receiver apparatus for a second WLAN device that supports an example retransmission protocol using incremental redundancy.

FIG. 13B depicts a block diagram of an example receiver apparatus for a second WLAN device that supports an example retransmission protocol using incremental redundancy. The example receiver apparatus 1301 shows some of the functional blocks in a receiving STA (such as the second WLAN device 120 described herein). The example receiver apparatus 1301 is one of many possible designs for a receiver. In the example of FIG. 13B, RF energy may be received by an analog front end of a receive (RX) chain 1355. For example, the RX chain 1355 may include an antenna and automatic gain control (AGC) components (not shown). Furthermore, the RX chain 1355 may include a fast Fourier transform (FFT) function to convert time domain symbols to a frequency domain representation of received data. $N_{RX}$ receive chains may prepare frequency domain representations of received data associated with each RX chain. Each spatial stream may be processed by a demodulation module 1360. The demodulation module 1360 may convert the frequency domain representations into a plurality of spatial streams. As a result, the demodulation module 1360 may provide $N_{SS}$ spatial streams. A stream combiner 1375 may reverse the process of the stream parser 1320 of the transmitter. For example, the stream combiner 1375 may combine bitstreams from multiple spatial streams to prepare encoded data bits for a decoding module 1380. The decoding module 1380 may decode the encoded bits. In some implementations, the decoding module 1380 may implement error correction using redundancy bits in the encoded bits. An FEC codeword receiver buffer 1370 may store a previous FEC codeword for subsequent use if the decoding module 1380 does not successfully decode the codeword. After receiving additional parity bits, the decoding module 1380 may obtain the stored FEC codeword from the FEC codeword receiver buffer 1370 and reattempt to decode it using the additional parity bits. A HARQ module 1385 may coordinate with the decoding module 1380 to implement the retransmission protocol. For example, the HARQ module 1385 may configure the decoding module 1380 for use with additional parity bits and may negotiate the retransmission protocol parameters with the first WLAN device. A feedback module 1395 may prepare a feedback message based on the retransmission protocol. A descrambler 1390 may reverse the scrambling performed by the scrambler 1310 and provide the data 1399 to an upper layer of the second WLAN device.

The HARQ module 1385 may implement some of the timing aspects described in this disclosure. For example, the HARQ module 1385 may cause the receiver apparatus 1301 to refrain from transmitting a second feedback message based on a delayed acknowledgement feature. In some implementations, the HARQ module 1385 may be configured to generate a PHY preamble ack according to the HARQ retransmission protocol while the HARQ module 1385 processes the received codewords.

Figure 14A:
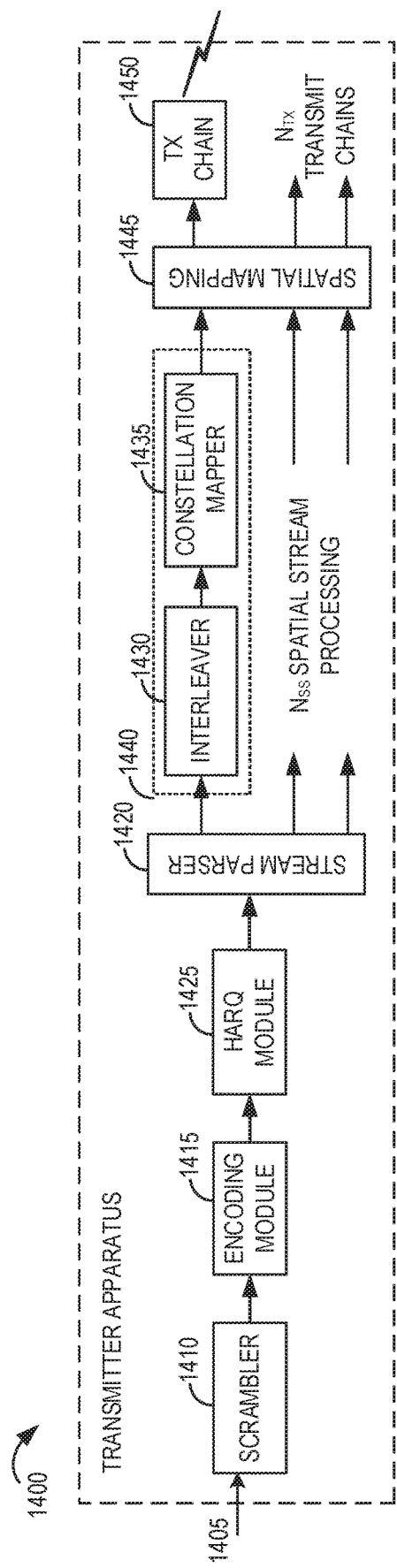
FIG. 14A depicts a block diagram of another example transmitter apparatus for a first WLAN device that supports an example retransmission protocol using punctured chase combining.

FIG. 14A depicts a block diagram of another example transmitter apparatus for a first WLAN device that supports an example retransmission protocol using punctured chase combining. The example transmitter apparatus 1400 shows some of the functional blocks in a first WLAN device (such as the first WLAN device 110 described herein). The example transmitter apparatus 1400 is one or may designs for a transmitter. In this figure, the example transmitter apparatus 1400 is designed for BCC encoding. In the design described in FIG. 14A, source data 1405 may be processed by a scrambler 1410 and an encoding module 1415. The scrambler 1410 may scramble the source data 1405 to reduce the probability of long sequences of zeros or ones. The scrambler 1410 may use a seed to determine the scrambled bits. In some implementations, a first WLAN device may indicate a scrambling seed or state in a message (such as a HARQ initial transmission) to the second WLAN device. In some implementations, the retransmitted data in a HARQ retransmission may use the same scrambling as the original data in a first HARQ transmission. Using the same scrambling may enable the second WLAN device to combine the HARQ transmissions before performing descrambling.

The encoding module 1415 may perform encoding for error correction and error detection. For example, the encoding module 1415 may perform FEC and add redundancy or CRC bits to the source data. The encoder may use BCC to encode the data. The encoded data may be sent to a stream parser 1420 that divides the encoded data into $N_{SS}$ spatial streams. In some implementations, there may only be one spatial stream and the stream parser 1420 may be unused. An example of spatial stream processing 1440 may include a HARQ module 1425, an interleaver 1430, and a constellation mapper 1435. The HARQ module 1425 may buffer encoded bits for the spatial stream so that they can be used, if necessary, for a HARQ retransmission. Although show before the stream parser 1420, in some implementations the HARQ module 1425 may be positioned after the stream parser 1420 or after the interleaver 1430. Alternatively, there may be multiple HARQ modules in the transmitter apparatus 1400 to support different options for HARQ retransmission. The interleaver 1430 interleaves the bits of each spatial stream (changes order of bits) to prevent long sequences of adjacent noisy bits from entering the BCC decoder. The interleaver 1430 may be present in transmitter designs that use BCC encoding. When LDPC encoding is used (rather than BCC), the interleaver 1430 may be omitted. Interleaving is applied only when BCC encoding is used. The constellation mapper 1435 maps the sequence of bits in each spatial stream to constellation points (complex numbers). The constellation mapper 1435 may perform the modulation of the bits based on an MCS that defines the constellation points.

After the spatial streams are processed, a spatial mapping 1445 may map space-time streams to $N_{TX}$ transmit chains (including TX chain 1450). There may be different ways of mapping the streams to transmit chains. For example, in a direct mapping the constellation points from each space-time stream may be mapped directly onto the transmit chains (one-to-one mapping). Another example may use spatial expansion, in which vectors of constellation points from all the space-time streams are expanded via matrix multiplication to produce the input to all of the transmit chains. The spatial mapping 1445 may support beamforming (like spatial expansion), in which each vector of constellation points from all of the space-time streams is multiplied by a matrix of steering vectors to produce the input to the transmit chains.

Each TX chain 1450 may prepare a plurality of OFDM symbols based on the constellation points. For example, the TX chain 1450 may include an inverse discrete Fourier transform (IDFT) that converts a block of constellation points to a time domain block. The TX chain 1450 may include a cyclic shift (CSD), guard interval inserter, and an analog front end to transmit OFDM symbols as radio frequency (RF) energy.

The transmitter apparatus 1400 described in FIG. 14A is only one example of a transmitter apparatus. Other block diagrams may add or remove functional blocks.

In FIG. 14A, the example transmitter apparatus 1400 may support BCC or LDPC encoding. When using partial retransmission (such as punctured chase combining or incremental redundancy), the retransmitted coded bits (in the HARQ retransmission) generated from same source data may not be in the "same" stream as the original coded bits in the HARQ initial transmission. In the example of FIG. 14A, the HARQ module 1425 may be used to perform HARQ encoding or retransmission before the stream parser 1420. Doing so may enable the transmitter apparatus to use different quantities of spatial streams for the HARQ retransmission than were used in the HARQ initial transmission.

Figure 14B:
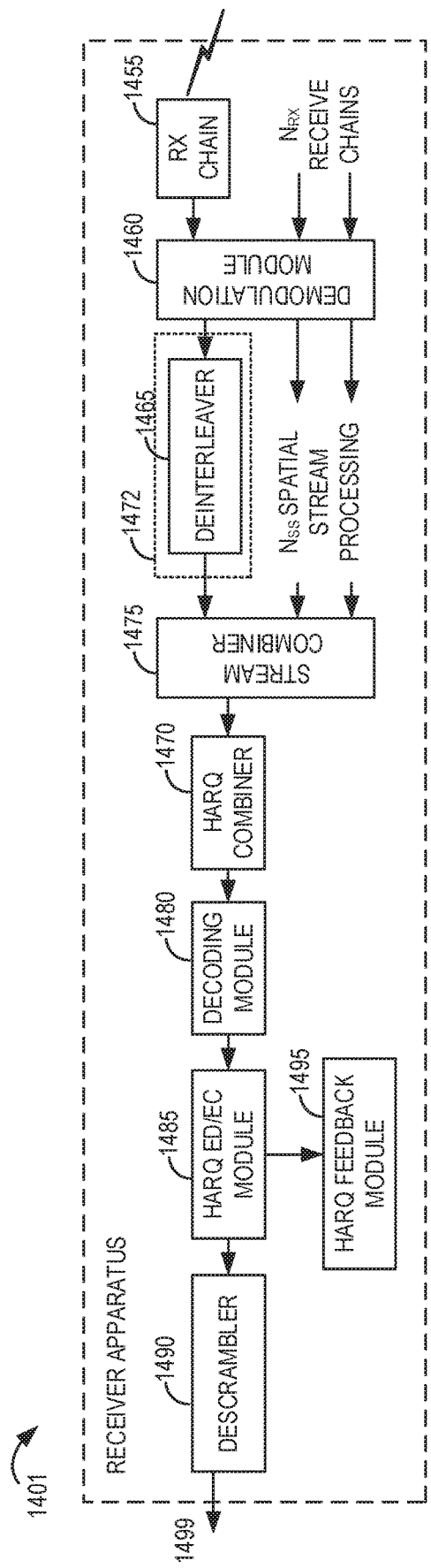
FIG. 14B depicts a block diagram of another example receiver apparatus for a second WLAN device that supports the example retransmission protocol using punctured chase combining.

FIG. 14B depicts a block diagram of another example receiver apparatus for a second WLAN device that supports the example retransmission protocol using punctured chase combining. The example receiver apparatus 1401 shows some of the functional blocks in a second WLAN device (such as the second WLAN device 120 described herein. The example receiver apparatus 1401 is one of many possible designs for a receiver. In the example of FIG. 14B, RF energy may be received by an analog front end of a receive (RX) chain 1455. For example, the RX chain 1455 may include an antenna and automatic gain control (AGC) components (not shown). Furthermore, the RX chain 1455 may include a fast Fourier transform (FFT) function to convert time domain symbols to a frequency domain representation of received data. $N_{RX}$ receive chains may prepare frequency domain representations of received data associated with each RX chain. Each spatial stream may be processed by a demodulation module 1460. The demodulation module 1460 may convert the frequency domain representations into a plurality of spatial streams. As a result, the demodulation module 1460 may provide $N_{SS}$ spatial streams. An example of spatial stream processing 1472 may include a deinterleaver 1465 and a HARQ combiner 1472. If BCC interleaver was used in the transmitter apparatus 1400, the deinterleaver 1465 may perform a de-interleaving of the bitstream to recover an original ordering of the bitstream. A stream combiner 1475 may reverse the process of the stream parser 1420 of the transmitter. For example, the stream combiner 1475 may combine bitstreams from multiple spatial streams to prepare encoded data bits to send to the HARQ module 1470. The HARQ module 1470 may be used to perform HARQ processing after the stream combiner 1475. FIG. 14B supports a HARQ process that corresponds to the transmitter apparatus described in FIG. 14A. In some implementations, the HARQ module 1470 may be located between the deinterleaver 1465 and the stream combiner 1475. The HARQ combiner 1470 combines a HARQ retransmission with a HARQ initial transmission having the same codewords. The HARQ combiner 1470 may use LLR calculations to recover a bit stream. The HARQ module 1470 may send the recovered bit stream to the decoding module 1480.

The decoding module 1480 may decode the encoded bits. In some implementations, the decoding module 1480 may implement error correction using redundancy bits in the encoded bits. A HARQ error detection and error correction module 1485 may use a HARQ process in coordination with the decoding module 1480. For example, the HARQ error detection and error correction module 1485 may attempt to correct errors in the decoded bits. A HARQ feedback module 1495 may prepare a feedback message based on the HARQ protocol. A descrambler 1490 may reverse the scrambling performed by the scrambler 1410 and provide the data 1499 to an upper layer of the second WLAN device.

Figure 15:
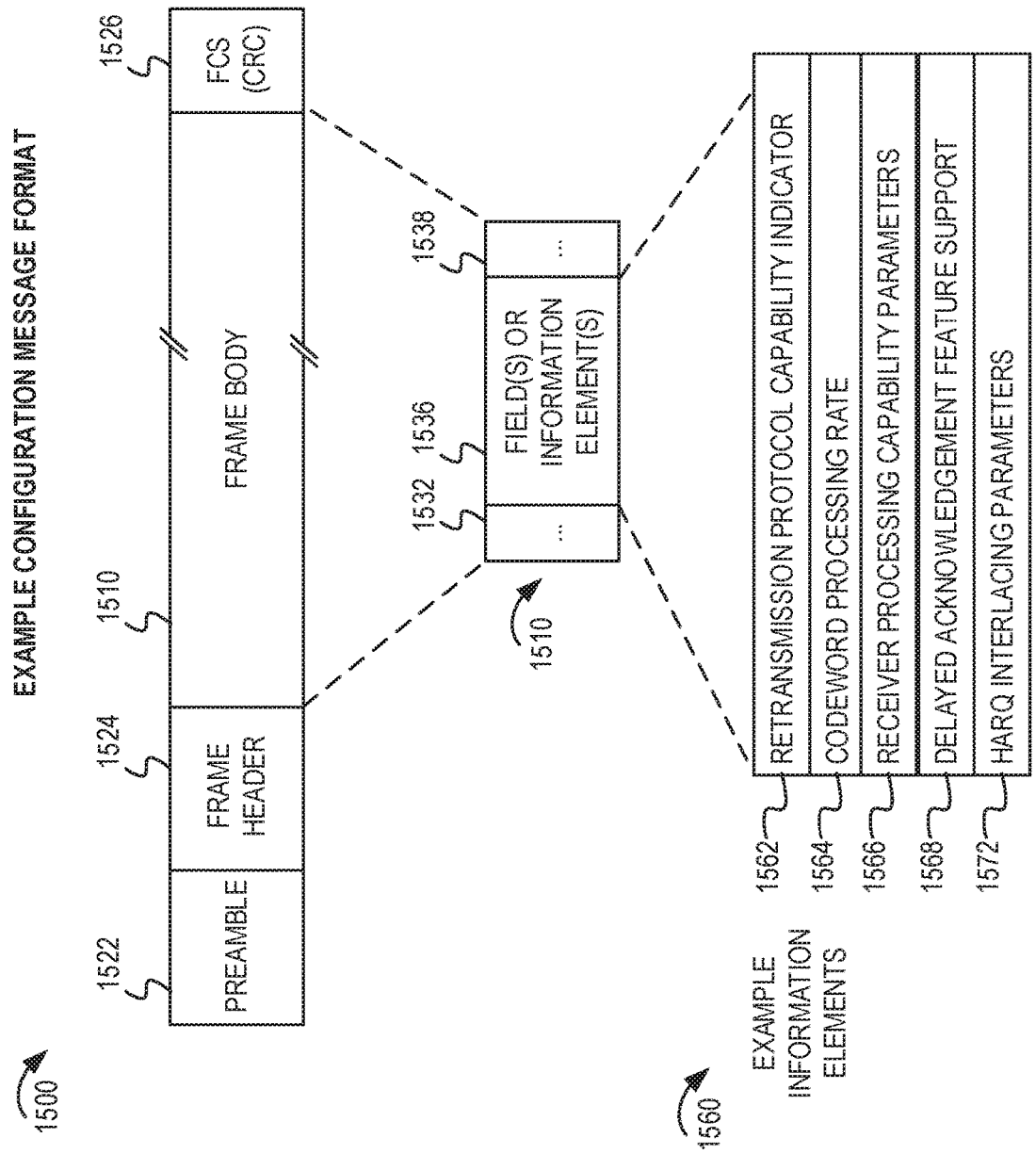
FIG. 15 depicts a conceptual diagram of an example configuration message for use with aspects of this disclosure.

FIG. 15 depicts a conceptual diagram of an example configuration message for use with aspects of this disclosure. For example, the example message 1500 may be sent from a first WLAN device to a second WLAN device, or vice versa. The example message 1500 may include a preamble 1522, a header 1524, a payload 1510, and a frame check sequence (FCS) 1526. The preamble 1522 may include one or more bits to establish synchronization. The preamble 1522 may be used, for example, when a dedicated discovery channel uses a listen-before-talk, contention-based access, or carrier sense access. In some implementations, if the dedicated discovery channel uses a scheduled timeslot for transmission, the preamble 1522 may be omitted. The header 1524 may include source and destination network addresses (such as the network address of the sending AP and receiving AP, respectively), the length of data frame, or other frame control information. In some implementations, the header 1524 also may indicate a technology type associated with a technology-specific payload (if the payload 1510 is specific to a particular technology type or types). The payload 1510 may be used to convey the retransmission protocol parameters. The retransmission protocol parameters may be organized or formatted in a variety of ways. The payload 1510 may be organized with a message format and may include information elements 1532, 1536, and 1538. Several examples of information elements are illustrated in FIG. 15.

Example information elements 1560 may be sent as part of a retransmission protocol configuration or setup message. In some implementations, the example information elements 1560 may include initial (default) parameters for a retransmission protocol. In some implementations, the example information elements 1560 may include a retransmission protocol capability indicator 1562 to indicate that the WLAN device supports the retransmission protocol features in this disclosure. The example information elements 1560 may include a codeword processing rate 1564, one or more other receiver processing capability parameters 1566, a delayed acknowledgement feature support indicator 1568, HARQ interlacing parameters 1572, or any combination thereof. The codeword processing rate 1564 and one or more other receiver processing capability parameters 1566 may inform the first WLAN device (as transmitter) about the processing capabilities of the second WLAN device (as receiver). The delayed acknowledgement feature support indicator 1568 may be a version number or an explicit indicator that indicates that a WLAN device supports the delayed acknowledgement features of this disclosure. The HARQ interlacing parameters 1572 may include parameters to support the transmission of interlaced communications (different communications) during a HARQ session with the other WLAN device. For example, the HARQ interlacing parameters 1572 may indicate that a first WLAN device will communicate a different communication after sending a HARQ retransmission and before expecting to receive a second feedback message from the second WLAN device.

Figure 16:
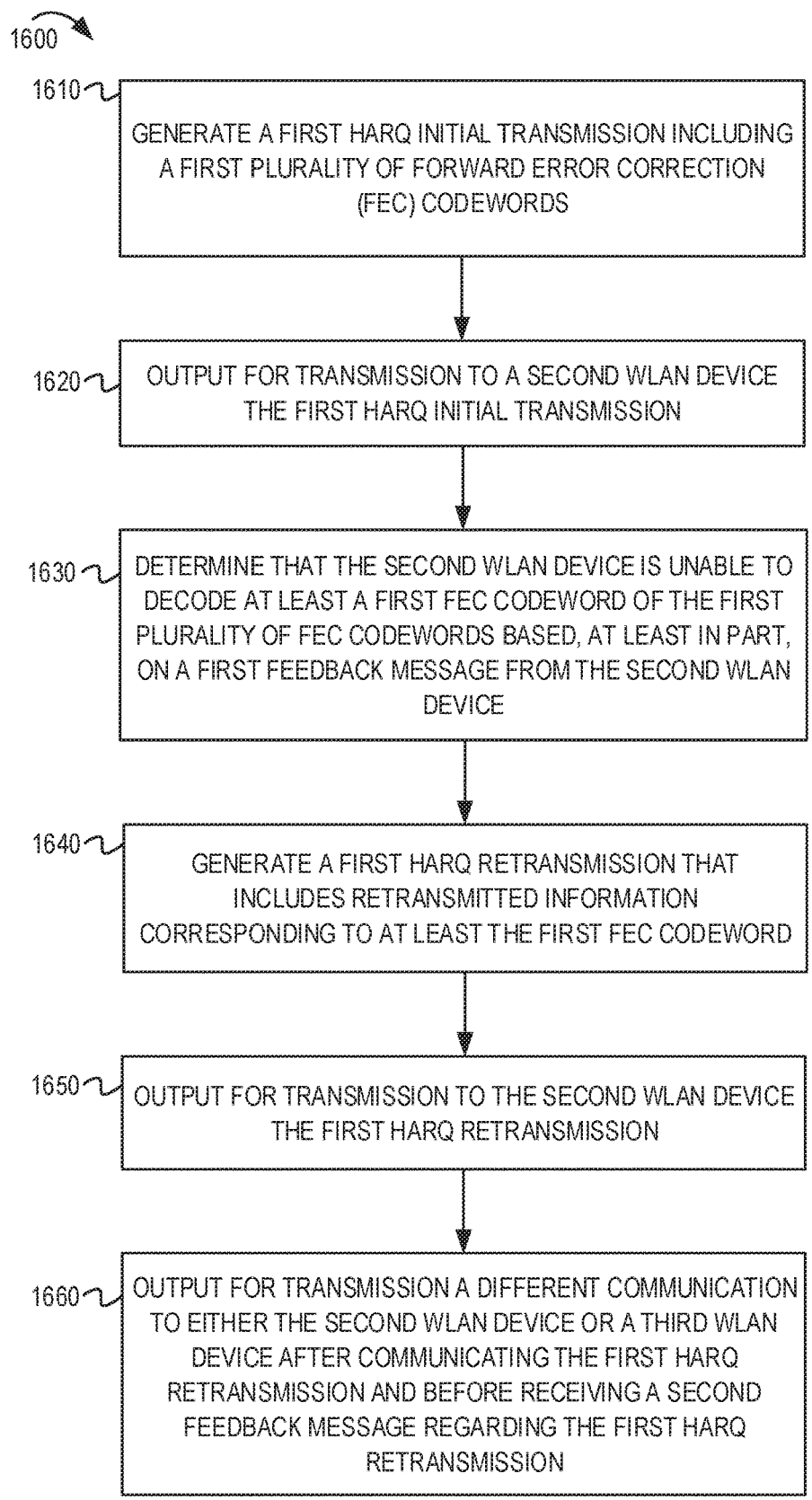
FIG. 16 depicts a flowchart with an example process for a WLAN device that communicates HARQ transmissions according to aspects of this disclosure.

FIG. 16 depicts a flowchart with an example process 1600 for a WLAN device that communicates HARQ transmissions according to aspects of this disclosure. The example process 1600 may be performed by a first WLAN device (such as the first WLAN device 110). At block 1610, the first WLAN device may generate a first HARQ initial transmission including a first plurality of forward error correction (FEC) codewords. At block 1620, the first WLAN device may output for transmission to the second WLAN device the first HARQ initial transmission. At block 1630, the first WLAN device may determine that the second WLAN device is unable to decode at least a first FEC codeword of the first plurality of FEC codewords based, at least in part, on a first feedback message from the second WLAN device. At block 1640, the first WLAN device may generate a first HARQ retransmission that includes retransmitted information corresponding to at least the first FEC codeword. At block 1650, the first WLAN device may output for transmission to the second WLAN device the first HARQ retransmission. At block 1660, the first WLAN device may output for transmission a different communication to either the second WLAN device or a third WLAN device after communicating the first HARQ retransmission and before receiving a second feedback message regarding the first HARQ retransmission.

Figure 17:
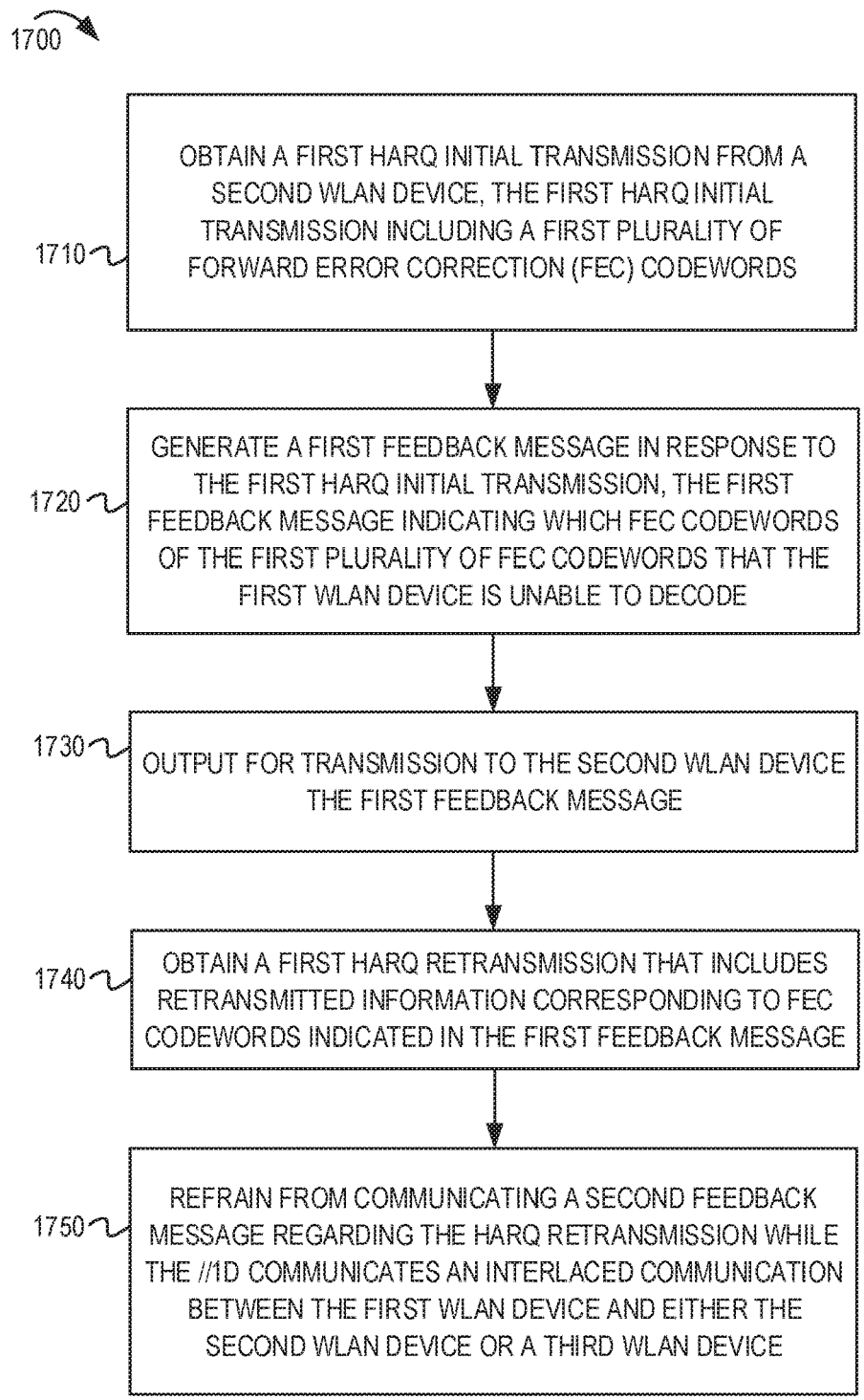
FIG. 17 depicts a flowchart with an example process for a WLAN device that communicates HARQ transmissions according to aspects of this disclosure.

FIG. 17 depicts a flowchart with an example process 1700 for a WLAN device that receives HARQ transmissions according to aspects of this disclosure. The example process 1700 may be performed by a first WLAN device (such as the second WLAN device 120 described herein) that participates in a retransmission protocol with another WLAN device that communicates HARQ transmissions. At block 1710, the first WLAN device may obtain a first HARQ initial transmission from a second WLAN device. The first HARQ initial transmission may include a first plurality of forward error correction (FEC) codewords. At block 1720, the first WLAN device may generate a first feedback message from the first WLAN device in response to the first HARQ initial transmission, the first feedback message indicating which FEC codewords of the first plurality of FEC codewords that the first WLAN device is unable to decode. At block 1730, the first WLAN device may output for transmission to the second WLAN device the first feedback message. At block 1740, the first WLAN device may obtain a first HARQ retransmission that includes retransmitted information corresponding to FEC codewords indicated in the first feedback message. At block 1750, the first WLAN device may refrain from communicating a second feedback message regarding the HARQ retransmission while the second WLAN device transmits a different communication to either the first WLAN device a third WLAN device.

Figure 18:
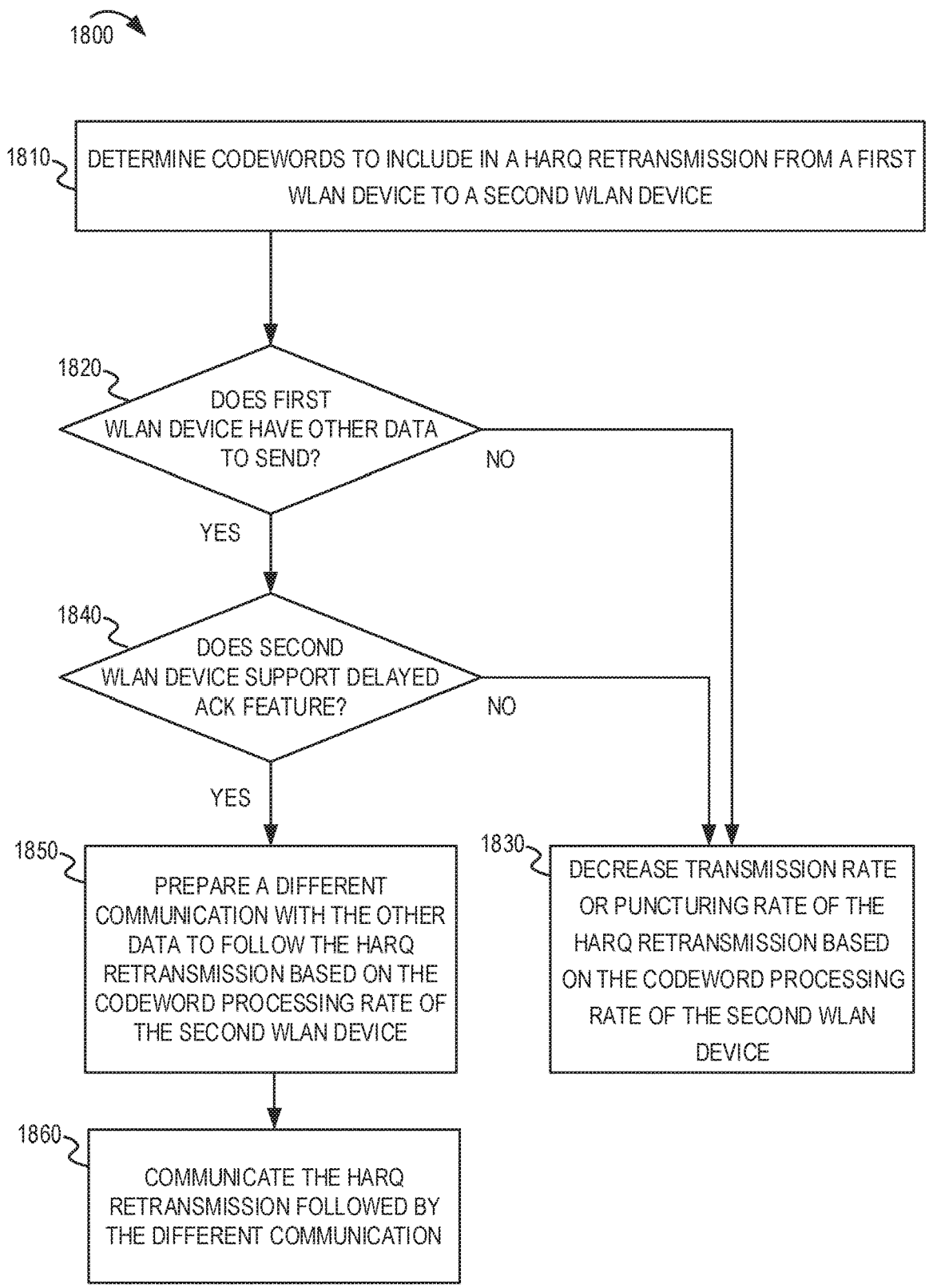
FIG. 18 depicts a flowchart with an example process for determining whether to use a delayed acknowledgement feature based on receiver processing capability.

FIG. 18 depicts a flowchart with an example process 1800 for determining whether to use a delayed acknowledgement feature based on receiver processing capability. At block 1810, the first WLAN device may determine codewords to include in a HARQ retransmission from the first WLAN device to a second WLAN device. For example, the codewords may correspond to a previous HARQ initial transmission and which were indicated in a HARQ feedback as unsuccessfully decoded by the second WLAN device. At block 1820, the first WLAN device may determine if the first WLAN device has other data to send (either to the second WLAN device or to another WLAN device). If there is no other data to send, the example process 1800 may proceed to block 1830. Otherwise, if there is other data to send, the example process 1800 may proceed to block 1840. At block 1840, the first WLAN device may determine if the second WLAN device supports a delayed acknowledgement feature as described herein. If the second WLAN device does not support the delayed acknowledgement feature, the example process 1800 may proceed to block 1830. If the second WLAN device does support the delayed acknowledgement feature, the example process 1800 may proceed to block 1850.

At block 1830, because there is no other data to send or because the second WLAN device does not support the delayed acknowledgement feature, the first WLAN device may decrease the transmission rate or the puncturing rate of the HARQ retransmission based on the codeword processing rate of the second WLAN device. For example, the first WLAN device may determine the transmission rate or puncturing rate such that the second WLAN device will have enough processing time to process the HARQ retransmission and provide the second feedback message following the HARQ retransmission.

At block 1850, if the first WLAN device has other data to send and the second WLAN device supports the delayed acknowledgement feature, the first WLAN device may prepare a different communication with the other data. The different communication will be sent following the HARQ retransmission (interlaced between the HARQ retransmission and the second feedback message) to provide enough time for the second WLAN device to process the HARQ retransmission before an expected second feedback message following the different communication. The amount of data in the different communication (or duration of the different communication) may be based on the codeword processing rate that the second WLAN device will use to process the HARQ retransmission. At block 1860, the first WLAN device may communicate the HARQ retransmission followed by the different communication.

Figure 19:
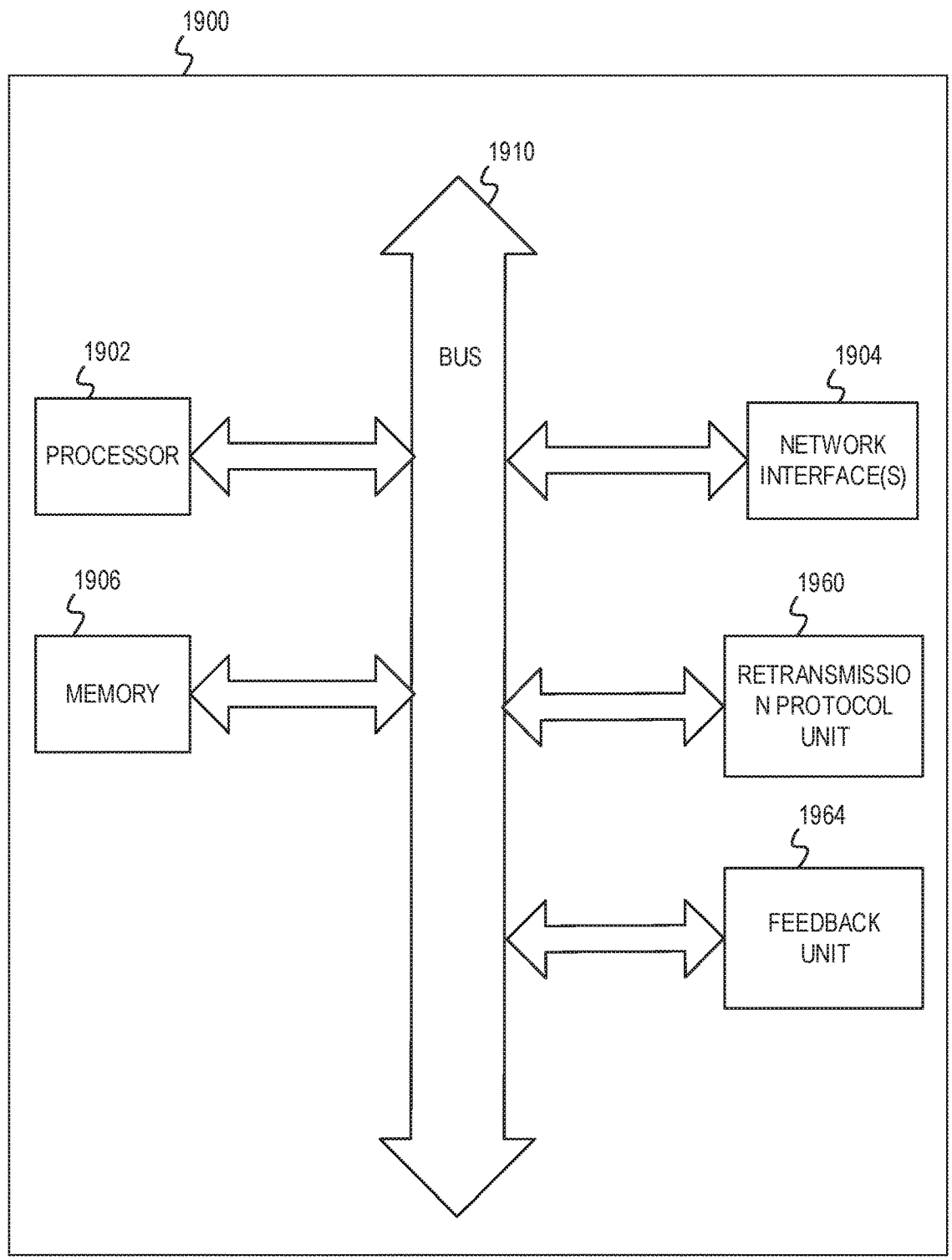
FIG. 19 shows a block diagram of an example electronic device for implementing aspects of this disclosure.

FIG. 19 shows a block diagram of an example electronic device for implementing aspects of this disclosure. In some implementations, the electronic device 1900 may be one of an access point (including any of the APs described herein), a range extender, or other electronic systems. The electronic device 1900 can include a processor 1902 (possibly including multiple processors, multiple cores, multiple nodes, or implementing multi-threading, etc.). The electronic device 1900 also can include a memory 1906. The memory 1906 may be system memory or any one or more of the possible realizations of computer-readable media described herein. The electronic device 1900 also can include a bus 1910 (such as PCI, ISA, PCI-Express, HyperTransport®, Infini-Band®, NuBus,® AHB, AXI, etc.), and a network interface 1904 that can include at least one of a wireless network interface (such as a WLAN interface, a Bluetooth® interface, a WiMAX® interface, a ZigBee® interface, a Wireless USB interface, etc.) and a wired network interface (such as an Ethernet interface, a powerline communication interface, etc.). In some implementations, the electronic device 1900 may support multiple network interfaces—each of which is configured to couple the electronic device 1900 to a different communication network.

The electronic device 1900 may include retransmission protocol unit 1960 (which may implement a HARQ protocol as described herein) and a feedback unit 1964. In some implementations, the retransmission protocol unit 1960 and the feedback unit 1964 may be distributed within the processor 1902, the memory 1906, and the bus 1910. The retransmission protocol unit 1960 and the feedback unit 1964 can perform some or all the operations described herein. For example, the retransmission protocol unit 1960 may be similar to the retransmission protocol unit 112 or the retransmission protocol unit 122 as described in FIG. 1. The feedback unit 1964 may be similar to the feedback unit 124 described in FIG. 1.

The memory 1906 can include computer instructions executable by the processor 1902 to implement the functionality of the implementations described in FIGS. 1-18. Any of these functionalities may be partially (or entirely)

implemented in hardware or on the processor 1902. For example, the functionality may be implemented with an application specific integrated circuit, in logic implemented in the processor 1902, in a co-processor on a peripheral device or card, etc. Further, realizations may include fewer or additional components not illustrated in FIG. 19 (such as video cards, audio cards, additional network interfaces, peripheral devices, etc.). The processor 1902, the memory 1906, and the network interface 1904 are coupled to the bus 1910. Although illustrated as being coupled to the bus 1910, the memory 1906 may be coupled to the processor 1902.

FIGS. 1-19 and the operations described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray™ disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication by a first wireless local area network (WLAN) device, comprising:
receiving a capability message from a second WLAN device indicating a receiver processing capability associated with a hybrid automatic repeat request (HARQ) retransmission protocol of a WLAN, wherein the receiver processing capability is based on an expected timing for HARQ feedback in the WLAN subject to a HARQ processing rate of the second WLAN device;
transmitting a first HARQ initial transmission from the first WLAN device to the second WLAN device, the first HARQ initial transmission including a first plurality of codewords;
receiving a first feedback message including HARQ feedback from the second WLAN device, the first feedback message indicating one or more codewords or groups of codewords within the first plurality of codewords that the second WLAN device is unable to decode, the one or more codewords or groups of codewords including at least a first codeword;
transmitting a first HARQ retransmission that includes retransmitted information corresponding to at least the first codeword to the second WLAN device; and
receiving a second feedback message including HARQ feedback from the second WLAN device regarding the first HARQ retransmission, the second feedback message indicating whether the at least the first codeword was successfully decoded by the second WLAN device.

2. The method of claim 1, wherein the first feedback message includes a bitmap to indicate which codewords or groups of codewords of the first HARQ initial transmission were successfully decoded by the second WLAN device.

3. The method of claim 1, wherein the first HARQ initial transmission includes data bits of the first codeword and a first subset of parity bits associated with the data bits, the first subset of parity bits not including punctured bits, and wherein the first HARQ retransmission includes at least a second subset of parity bits associated with data bits, the second subset of parity bits including the punctured bits.

4. The method of claim 3, wherein the first HARQ retransmission further includes repeated data bits of the first codeword.

5. The method of claim 1, further comprising:
transmitting a different communication to either the second WLAN device or a third WLAN device during a time period between the first HARQ initial transmission and the first feedback message or between the first HARQ retransmission and the second feedback message in accordance with a delayed acknowledgement feature of the HARQ protocol.

6. The method of claim 5, wherein transmitting the different communication includes transmitting a second HARQ initial transmission to the second WLAN device, wherein the second HARQ initial transmission includes a different plurality of codewords than were included in the first HARQ initial transmission.

7. The method of claim 1, further comprising:
wherein the capability message indicates that the second WLAN device supports a delayed acknowledgement feature of the HARQ protocol;
determining that the first WLAN device and the second WLAN device both support the delayed acknowledgement feature; and
transmitting a different communication to either the second WLAN device or a third WLAN device during a time period between the first HARQ initial transmission and the first feedback message or between the first HARQ retransmission and the second feedback message in accordance with the delayed acknowledgement feature.

8. The method of claim 5, wherein the different communication is transmitted to the third WLAN device, and wherein the first HARQ retransmission further includes signaling to instruct the second WLAN device to delay the second feedback message until after the different communication, the signaling is usable by the second WLAN device to determine a time to send the second feedback message.

9. The method of claim 8, wherein the signaling includes a time offset or time indicator.

10. The method of claim 8, wherein the signaling instructs the second WLAN device to refrain from sending the second feedback message until the first WLAN device sends a feedback request message.

11. The method of claim 1, wherein the expected timing for HARQ feedback is associated with at least one constraint selected from a group consisting of:
a time delay for the second WLAN device to process the first HARQ retransmission,
a codeword processing rate of the second WLAN device, and
a quantity of codewords within an orthogonal frequency division multiplexing (OFDM) symbol that the second WLAN device can process in a time period associated with the OFDM symbol.

12. The method of claim 1, wherein the expected timing for HARQ feedback is based on an amount of time for physical (PHY) layer processing of the first codeword using the first HARQ retransmission to determine a corrected first codeword.

13. The method of claim 1, further comprising:
generating an aggregated media access control (MAC) protocol data unit (A-MPDU);
generating codewords based on the A-MPDU, the codewords including at least the first plurality of codewords and a second plurality of codewords;
transmitting the first plurality of codewords in the first HARQ initial transmission; and
transmitting the one or more codewords of the first plurality of codewords in the first HARQ retransmission.

14. The method of claim 13, wherein transmitting the first HARQ retransmission to the second WLAN device includes:
transmitting the second plurality of codewords of the A-MPDU together with the one or more codewords of the first plurality of codewords that the second WLAN device is unable to decode in the first HARQ retransmission.

15. The method of claim 1,
wherein the first plurality of codewords are related to a source data to transmit to the second WLAN device, and wherein the first HARQ retransmission includes retransmitted information corresponding to the one or more codewords of the first plurality of codewords that the second WLAN device is unable to decode in a message that also includes a second HARQ initial transmission having a second plurality of codewords related to the source data.

16. The method of claim 15, further comprising:
transmitting a series of HARQ initial transmissions based on the source data, wherein at least one subsequent HARQ initial transmission is included in a packet that also includes a subsequent HARQ retransmission, the subsequent HARQ retransmission based on at least a portion of codewords that were not properly decoded in a previous HARQ initial transmission; and
receiving a HARQ feedback from the second WLAN device after each HARQ initial transmission, wherein the HARQ feedback includes feedback regarding a portion of an earlier HARQ initial transmission preceding a most recent HARQ initial transmission.

17. The method of claim 16, further comprising:
determining a HARQ feedback window based, at least in part, on the receiver processing capability of the second WLAN device, wherein the HARQ feedback window may be a different size than a quantity of codewords included in each HARQ initial transmission.

18. An apparatus for wireless communication by a first wireless local area network (WLAN) device, comprising:
at least one modem;
a processor communicatively coupled with the at least one modem; and
a memory communicatively coupled with the processor and having instructions stored therein which, when executed by the processor, cause the modem to:
obtain a capability message from a second WLAN device indicating a receiver processing capability associated with a hybrid automatic repeat request (HARQ) retransmission protocol of the WLAN, wherein the receiver processing capability is based on an expected timing for HARQ feedback in the WLAN subject to a HARQ processing rate of the second WLAN device;
output a first HARQ initial transmission for transmission from the first WLAN device to the second WLAN device, the first HARQ initial transmission including a first plurality of codewords;
obtain a first feedback message including HARQ feedback from the second WLAN device, the first feedback message indicating one or more codewords or groups of codewords within the first plurality of codewords that the second WLAN device is unable to decode, the one or more codewords or groups of codewords including at least a first codeword;
output a first HARQ retransmission that includes retransmitted information corresponding to at least the first codeword for transmission to the second WLAN device; and
obtain a second feedback message including HARQ feedback from the second WLAN device regarding the first HARQ retransmission, the second feedback message indicating whether the at least the first codeword was successfully decoded by the second WLAN device.

19. The apparatus of claim 18, wherein the first HARQ initial transmission includes data bits of the first codeword and a first subset of parity bits associated with the data bits, the first subset of parity bits not including punctured bits, and wherein the first HARQ retransmission includes at least a second subset of the parity bits associated with data bits, the second subset of parity bits including the punctured bits, and wherein the first HARQ retransmission further includes repeated data bits of the first codeword.

20. The apparatus of claim 18, wherein the instructions stored, when executed by the processor, further cause the modem to:
generate an aggregated media access control (MAC) protocol data unit (A-MPDU);
generate codewords based on the A-MPDU, the codewords including at least the first plurality of codewords and a second plurality of codewords;
output the first plurality of codewords for transmission in the first HARQ initial transmission; and
output the one or more codewords of the first plurality of codewords for transmission in the first HARQ retransmission,
wherein outputting the first HARQ retransmission to the second WLAN device includes outputting the second plurality of codewords of the A-MPDU together with the one or more codewords of the first plurality of codewords that the second WLAN device is unable to decode in the first HARQ retransmission.

21. The apparatus of claim 18,
wherein the first plurality of codewords are related to a source data to transmit to the second WLAN device, and
wherein the first HARQ retransmission includes retransmitted information corresponding to the one or more codewords of the first plurality of codewords that the second WLAN device is unable to decode in a message that also includes a second HARQ initial transmission having a second plurality of codewords related to the source data.

22. The apparatus of claim 21, wherein the instructions stored, when executed by the processor, further cause the modem to:
output a series of HARQ initial transmissions for transmission to the second WLAN device based on the source data, wherein at least one subsequent HARQ initial transmission is included in a packet that also includes a subsequent HARQ retransmission, the subsequent HARQ retransmission based on at least a portion of codewords that were not properly decoded in a previous HARQ initial transmission; and
obtain a HARQ feedback from the second WLAN device after each HARQ initial transmission, wherein the HARQ feedback includes feedback regarding a portion of an earlier HARQ initial transmission preceding a most recent HARQ initial transmission.

23. The apparatus of claim 22, wherein the instructions stored, when executed by the processor, further cause the modem to:
determine a HARQ feedback window based, at least in part, on a receiver HARQ processing rate of the second WLAN device, wherein the HARQ feedback window may be a different size than a quantity of codewords included in each HARQ initial transmission.

24. The apparatus of claim 18, further comprising:
at least one transceiver coupled to the at least one modem;
at least one antenna coupled to the at least one transceiver to wirelessly transmit signals output from the at least one transceiver and to wirelessly receive signals for input into the at least one transceiver; and
a housing that encompasses the at least one modem, the processor, the memory, the at least one transceiver and at least a portion of the at least one antenna.

25. A method for wireless communication by a first wireless local area network (WLAN) device, comprising:

transmitting a capability message to a second WLAN device indicating a receiver processing capability associated with a hybrid automatic repeat request (HARQ) retransmission protocol of the WLAN, wherein the receiver processing capability is based on an expected timing for HARQ feedback in the WLAN subject to a HARQ processing rate of the first WLAN device;

receiving a first HARQ initial transmission from the second WLAN device, the first HARQ initial transmission including a first plurality of codewords;

transmitting a first feedback message including HARQ feedback to the second WLAN device in response to the first HARQ initial transmission, the first feedback message indicating one or more codewords of the first plurality of codewords that the first WLAN device is unable to decode; and receiving a first HARQ retransmission that includes retransmitted information corresponding to the one or more codewords indicated in the first feedback message.

26. The method of claim 25, further comprising:
transmitting a second feedback message including HARQ feedback to the second WLAN device regarding the first HARQ retransmission after the second WLAN device transmits a different communication to either the first WLAN device or a third WLAN device.

27. The method of claim 26, wherein the second feedback message is transmitted after receiving a feedback request message from the second WLAN device or at a scheduled time indicated in a header of the first HARQ retransmission.

28. The method of claim 26, wherein the different communication includes a second HARQ initial transmission, the method further comprising:
receiving a HARQ physical protocol data unit (PPDU) that includes the first HARQ retransmission based on the first plurality of codewords and the second HARQ initial transmission for a second plurality of codewords.

29. An apparatus for wireless communication by a first wireless local area network (WLAN) device, comprising:
at least one modem;
a processor communicatively coupled with the at least one modem; and
a memory communicatively coupled with the processor and having instructions stored therein which, when executed by the processor, cause the modem to:
output a capability message for transmission to a second WLAN device, the capability message indicating a receiver processing capability associated with a hybrid automatic repeat request (HARQ) retransmission protocol of the WLAN, wherein the receiver processing capability is based on an expected timing for HARQ feedback in the WLAN subject to a HARQ processing rate of the first WLAN device;

obtain a first HARQ initial transmission from the second WLAN device, the first HARQ initial transmission including a first plurality of codewords;

output a first feedback message including HARQ feedback for transmission to the second WLAN device in response to the first HARQ initial transmission, the first feedback message indicating one or more codewords of the first plurality of codewords that the first WLAN device is unable to decode; and obtain a first HARQ retransmission that includes retransmitted information corresponding to the one or more codewords indicated in the first feedback message.

30. The apparatus of claim 29, wherein the instructions stored, when executed by the processor, further cause the modem to:
output a second feedback message including HARQ feedback for transmission to the second WLAN device regarding the first HARQ retransmission after the second WLAN device transmits a different communication to either the first WLAN device or a third WLAN device, wherein the second feedback message is transmitted after obtaining a feedback request message from the second WLAN device or at a scheduled time indicated in a header of the first HARQ retransmission.

31. The apparatus of claim 30, wherein the different communication includes a second HARQ initial transmission, and wherein the instructions stored, when executed by the processor, further cause the modem to:
obtain a HARQ physical protocol data unit (PPDU) that includes the first HARQ retransmission based on the first plurality of codewords and the second HARQ initial transmission for a second plurality of codewords.

32. The apparatus of claim 29, further comprising:
at least one transceiver coupled to the at least one modem;
at least one antenna coupled to the at least one transceiver to wirelessly transmit signals output from the at least one transceiver and to wirelessly receive signals for input into the at least one transceiver; and
a housing that encompasses the at least one modem, the processor, the memory, the at least one transceiver and at least a portion of the at least one antenna.

33. The apparatus of claim 29, wherein the instructions stored, when executed by the processor, further cause the modem to output a different communication to either the second WLAN device or a third WLAN device during a time period between the first HARQ initial transmission and the first feedback message or between the first HARQ retransmission and the second feedback message in accordance with a delayed acknowledgement feature of the HARQ protocol.

* * * * *